(12) United States Patent
Takahashi et al.

(10) Patent No.: US 7,791,763 B2
(45) Date of Patent: Sep. 7, 2010

(54) COLOR SEPARATION METHOD AND IMAGE PROCESSING DEVICE

(75) Inventors: Masaomi Takahashi, Kawasaki (JP); Kazuhiro Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 11/737,204

(22) Filed: Apr. 19, 2007

(65) Prior Publication Data

US 2007/0247678 A1  Oct. 25, 2007

(30) Foreign Application Priority Data

Apr. 20, 2006 (JP) .............................. 2006-116790

(51) Int. Cl.
G03F 3/08 (2006.01)
(52) U.S. Cl. ........................ 358/1.9; 358/515; 358/518; 358/3.06
(58) Field of Classification Search .................. 358/1.9, 358/515, 518, 3.06
See application file for complete search history.

(56) References Cited

U.S. PATENT DOCUMENTS

| 6,897,988 | B1 | 5/2005 | Saito et al. ................ 358/515 |
| 7,123,391 | B2 | 10/2006 | Saito .......................... 358/518 |
| 2003/0076516 | A1* | 4/2003 | Saito .......................... 358/1.9 |
| 2003/0202197 | A1 | 10/2003 | Saito et al. ................ 358/1.9 |
| 2003/0234946 | A1 | 12/2003 | Saito .......................... 358/1.9 |
| 2004/0021885 | A1* | 2/2004 | Nishikawa .................. 358/1.9 |
| 2004/0070777 | A1 | 4/2004 | Nishikawa et al. ........... 358/1.9 |
| 2004/0100640 | A1 | 5/2004 | Saito .......................... 358/1.1 |
| 2005/0231550 | A1* | 10/2005 | Konno et al. ................ 347/43 |

FOREIGN PATENT DOCUMENTS

JP  2003-110864  4/2003

* cited by examiner

Primary Examiner—Benny Q Tieu
Assistant Examiner—Qian Yang
(74) Attorney, Agent, or Firm—Fitzpatrick, Cella, Harper & Scinto

(57) ABSTRACT

A dark and light color separation of four fundamental colors into color materials containing light ink is realized at high speeds. A cross patch where a discrete color material amount with regard to two kinds of color materials having a different density is distributed in a cross pattern is printed by an image output device. In addition, there are produced a density characteristics map and a color material amount characteristics map. Accordingly, the cell of the equal color material amount is searched within a range not exceeding a target color material use amount from the color material characteristics map and the cell of the equal density is searched within a range not exceeding a target density from the density characteristics map. As a result, it is possible to determine a combination of a color material amount of each of a dark color material and a light color material.

7 Claims, 23 Drawing Sheets

COLOR SEPARATION METHOD AND IMAGE PROCESSING DEVICE

BACKGROUND OF THE INVENTION

1. Field of the Invention

The present invention relates to a color separation method and an image processing apparatus, and in particular to color separation in converting an image signal into a signal of an amount in a color material such as ink or toner.

2. Description of the Related Art

There is conventionally a case where cyan (C), magenta (M), yellow (Y) and black (K) as fundamental color materials of a printing apparatus and in addition to them, light color cyan (Lc), light color magenta (Lm) and the like as light color materials are used to perform recording. In this case, for effecting the color separation to provide color material signals containing a light color, there is known a method of effecting color separation of a signal of a dark color material having a color into a color material signal of each of dark and light colors. In addition, as an image processing apparatus of effecting such color separation, there is known a method as described in Japanese Patent Laid-Open No. 2003-110864. According to this method, by producing an ink color separation table for setting a UCR amount or a BG amount most suitable for each hue, it is possible to effect the color separation using a color reproducibility region at a maximum in an image forming device such as a color printer. In addition, this method can absorbs linear characteristics occurring when a plurality of ink is blended in color, therefore making it possible to reduce influence of granularity due to black without distorted characteristics in lightness, hue and color saturation.

FIG. 23 is a diagram for determining a color material amount of each of a dark color material and a light color material in the conventional dark and light color separation processing. The same figure shows an ink amount for printing a patch of each dark and light color cyan corresponding to a grid of 9×9=81. The lateral direction thereof shows that an ink amount of dark color cyan changes in a range of from Cg 00 to Cg 08 and the longitudinal direction thereof shows that an ink amount of light color cyan changes in a range of from Lcg 00 to Lcg 08. In addition, a slant broken line shows an equal ink amount line in the total ink amount of the dark and light color ink. Further, a slant solid line shows an equal density line in the density of a patch, which is measured in color by printing the patch and then is plotted. Based upon these lines, the dark and light color separation processing is performed from intersection points between the equal ink amount line and the equal density line.

In general, for enhancing accuracy of dark and light color separation, it is required to increase the grid number on a cross patch. This case, however, leads to an increasing search amount in the intersection points between the equal ink amount line and the equal density line in proportion to the grid number. As a result, time required for the dark and light color separation processing becomes longer.

SUMMARY OF THE INVENTION

The present invention is made in view of the foregoing problems and it is an object of the present invention to provide an image processing apparatus which can effect dark and light color separation at high speeds from four fundamental colors of C, M, Y and K into color materials containing light color ink such as Lc and Lm.

Therefore, according to the present invention, a color separation method including processing for converting an image signal into a signal of a color material used in a printing apparatus, the processing converting the image signal into a color material signal containing a color material value of a dark color material and a color material value of a light color material, said method comprising: a step of producing a density characteristics map including cells of M rows×N columns showing a density of each of the dark color material and the light color material; a step of producing a color material amount characteristics map including cells of M rows×N columns showing a color material amount of each of the dark color material and the light color material; a step of searching a cell of a target equal density from the density characteristics map; a step of searching a cell of a target equal color material amount from the color material amount characteristics map; a step of searching the cell in a certain direction; a step of setting the color material amount of each of the dark color material and the light color material in a cell where the line and the row correspond with each other on the equal color material amount characteristics map, as a color material amount of each of the dark color material and the light color material, in a case where the line and the row between the equal density line and the equal color material amount line correspond with each other; and a step of setting a color material amount of each of the dark color material and the light color material in a cell in the same line in the certain direction on the equal color material amount characteristics map, as well as on the color material amount characteristics map of the target equal color material amount as a color material amount of each of the dark color material and the light color material, in a case where the line and the row between the equal density line and the equal color material amount line do not correspond with each other, when a color material amount in the cell on the color material amount characteristics map exceeds the target equal color material amount.

According to the above arrangement, in a dark and light color material amount separation image processing method of effecting the color separation of a dark color material into two kinds of dark and light color materials containing a light color material, there is produced a density characteristics map constituted of a cell of N lines×N rows. In addition, a color material characteristics map constituted of cells of N lines×N rows is produced by using interpolation means to a discrete color material amount in a cross patch. Accordingly, a cell of an equal color material amount line is searched within a range not exceeding a target color material use amount from the color material characteristics map and a cell of an equal density line is searched within a range not exceeding a target density from the density characteristics map. As a result, it is possible to detect a cell in which the equal color material amount line intersects the equal density line. Therefore, it is possible to determine a combination of color material amounts between the dark color material and the light color material from the cell for the intersection. This arrangement can provide a search method of determining each color material amount of dark and light colors.

Further features of the present invention will become apparent from the following description of exemplary embodiments (with reference to the attached drawings).

DESCRIPTION OF THE EMBODIMENTS

Embodiments of the present invention will be hereinafter described in detail with reference to the accompanying drawings.

First Embodiment

Figure 1:
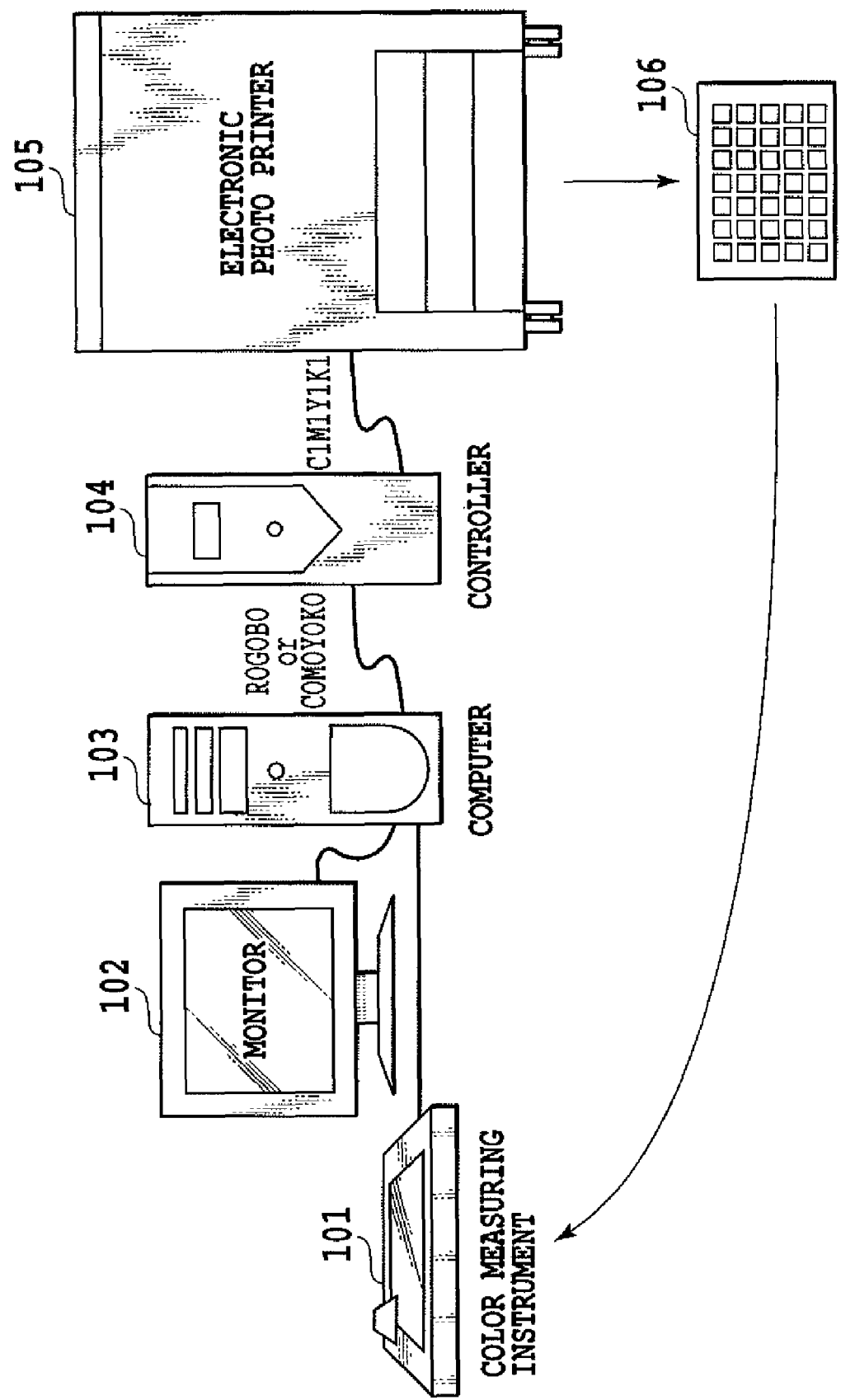
FIG. 1 is a block diagram showing an image processing arrangement of an electronic photo printer in a first embodiment of the present invention.

FIG. 1 is a block diagram showing an image processing system in a first embodiment of the present invention. In the same figure, a color measuring instrument 101 such as a scanner measures a color of a patch. The color measuring result is used in producing input data of a toner table producing section 208 and an OPG table producing section 209, which will be described later. A display device 102 such as a monitor displays image signal information edited or processed by a computer 103 such as a personal computer. A controller 104 performs color conversion of a R0G0B0 image or a C0M0Y0K0 image from the computer 103 into a C1M1Y1K1 image. An electronic photo printer 105 as an image output device prints and outputs a printed material. A patch 106 is printed by the electronic photo printer 105 and is measured in color by the color measuring instrument 101.

Figure 2:
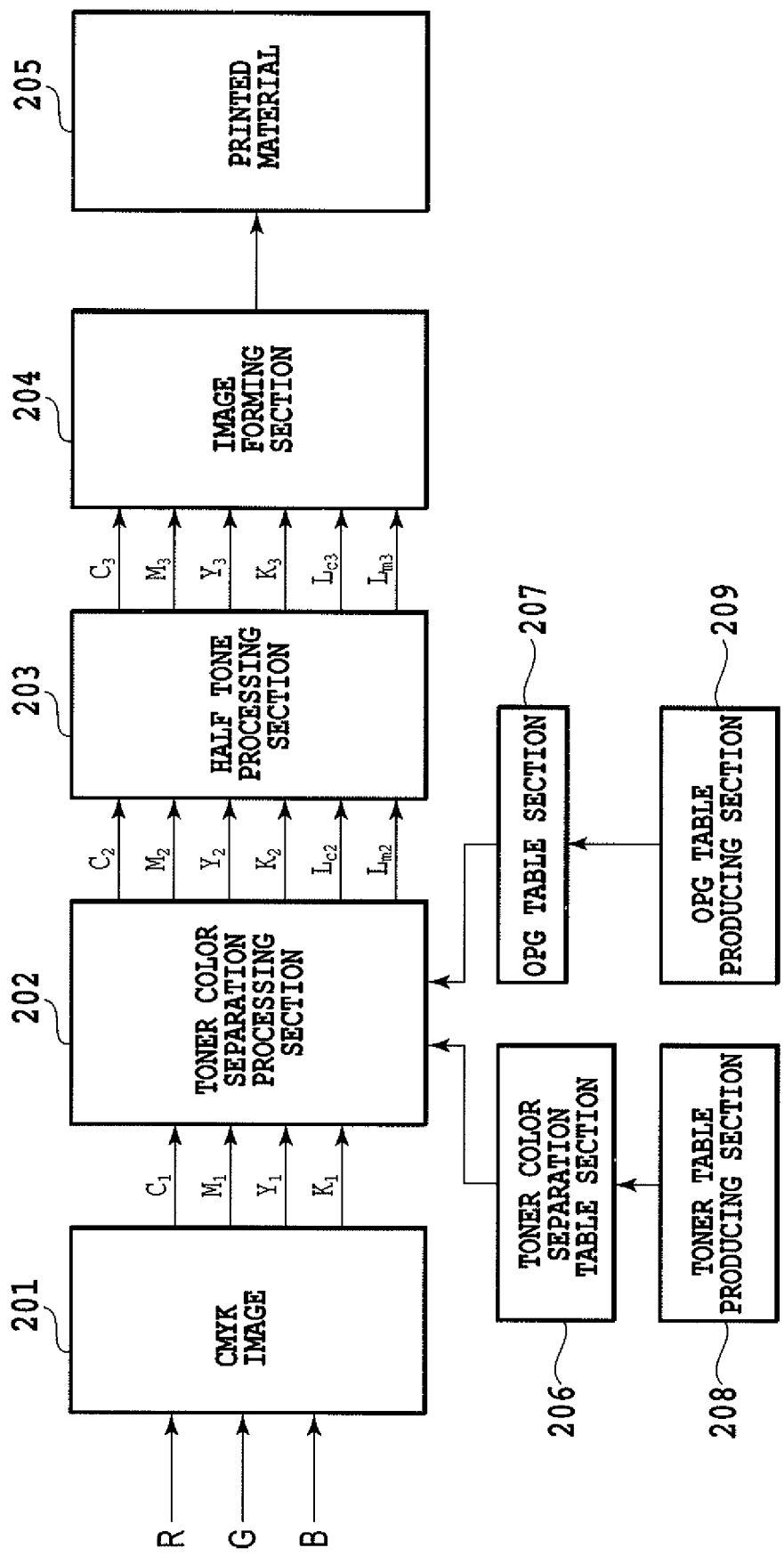
FIG. 2 is a diagram showing a detailed image processing system arrangement for executing an image processing in the first embodiment of the present invention.

FIG. 2 is a block diagram showing an image processing arrangement of the electronic photo printer. The same figure shows processing to be executed by the electronic photo printer, but this processing may be executed by an ink jet printer, a dye sublimation printer or the like and can be applied to an image processing apparatus using a plurality of color materials.

The C1M1Y1K1 image 201 is an image formed by color-converting the R0G0B0 image or the C0M0Y0K0 image by the controller 104. That is, in a case where an image signal R0G0B0 inputted shows a monitoring color such as sRGB, the color separation processing is executed by the controller 104 so that a reproducible color in the monitor 102 and a reproducible color in the electronic photo printer 105 become the same. In addition, in a case where the C0M0Y0K0 shows a reproducible color in printing, the color separation processing is executed so that the reproducible color in printing and a reproducible color of C, M, Y and K in the electronic photo printer 105 become the same. A toner color separation processing section 202 is a step of executing interpolation calculation processing. The interpolation calculation processing is executed based upon a toner color separation table section 206 produced by a toner table producing section 208 and an OPG (Output Gamma) table section 207 produced by an OPG table producing section 209. The interpolation processing is executed by four-faced or cube interpolation processing. Table information for converting C1M1Y1K1 into C2M2Y2K2Lc2Lm2 is stored in the toner color separation table section 206.

A half tone processing section 203 executes N numerical data processing in such a manner that C2M2Y2K2Lc2Lm2 multi numerical data from the toner color separation processing section 202 can be expressed in the electronic photo printer 105. In this way, a continuous gradation can be expressed artificially. In addition, an image forming section 204 is an engine for the electronic photo printer and a printed material formed therein becomes 205.

Figure 3:
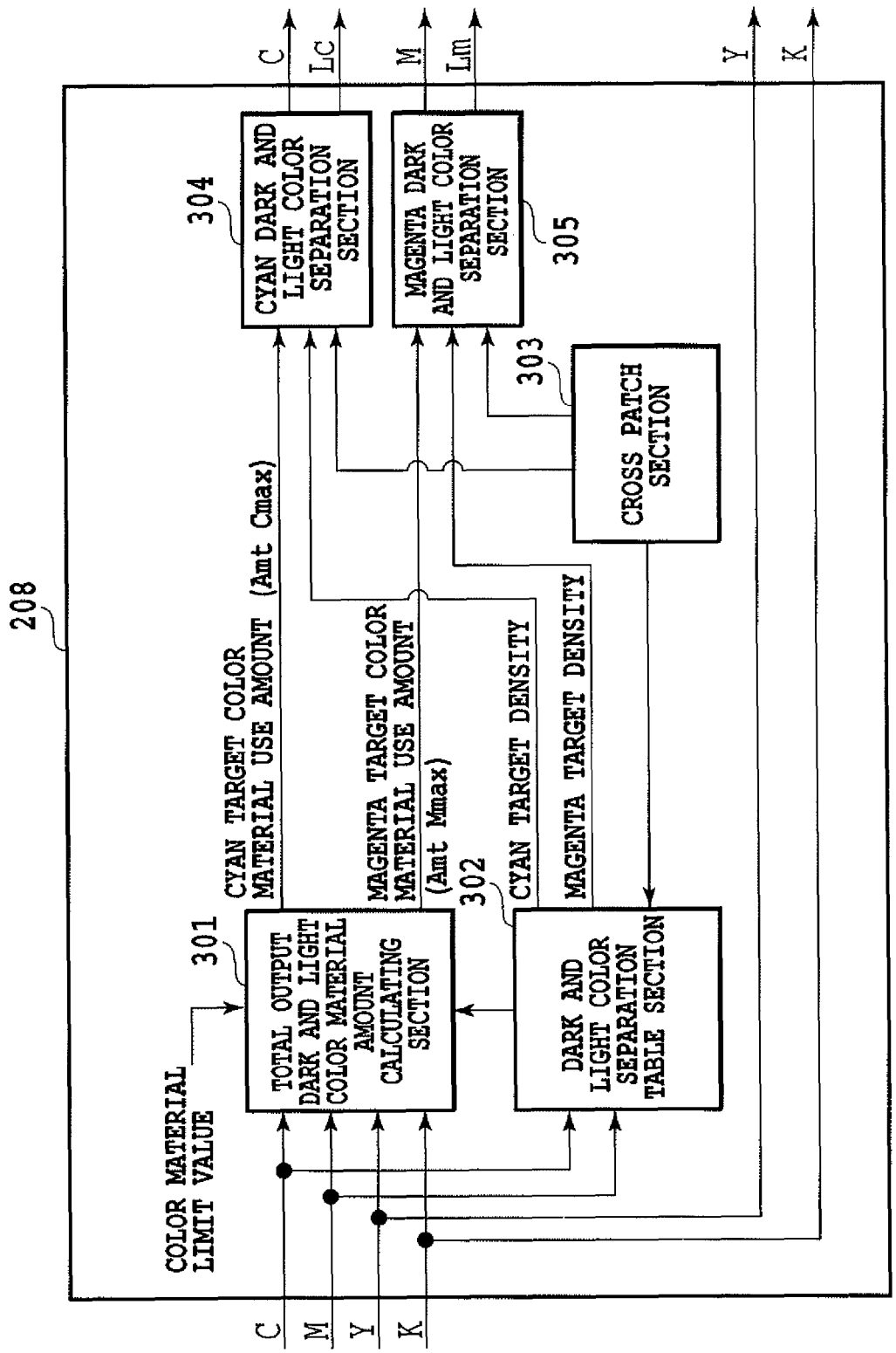
FIG. 3 is a block diagram showing a detailed arrangement of a color separation producing section in the first embodiment of the present invention.

FIG. 3 is a block diagram showing a detailed arrangement of the toner table producing section 208 shown in FIG. 2. The toner table producing section 208 performs color separation of four fundamental colors of C, M, Y and K into six dark and light colors containing Lc and Lm.

A total output dark and light color material amount calculating section 301 is a step of calculating a maximum amount of color materials usable for recording in consideration of variant characteristics such as an adhesion characteristic of a color material in a recording medium (hereinafter referred to as "target color material use amount").

More specially an entire color material use amount of C, M, Y and K (Amt (C, M, Y, K) to be inputted is calculated. In addition, a color-material-increase possible amount of a total color material amount (hereinafter referred to as "total color-material-increase possible amount") is calculated based upon a color material amount limit value (AmtLIMT) as a limit value within which toner can adhere defined based upon properties of a recording medium and the toner. The total color-material-increase possible amount becomes (AmtLIMIT−Amt (C, M, Y, K)). In addition, based upon these, a cyan target color material use amount (AmtCmax) and a magenta target color material use amount (AmtMmax) are determined. At this point, a cyan color-material-increase possible amount (AmtCup) and a magenta color-material-increase possible amount (AmtMup) calculated in the dark and light color separation table section 302 are utilized.

Figure 4:
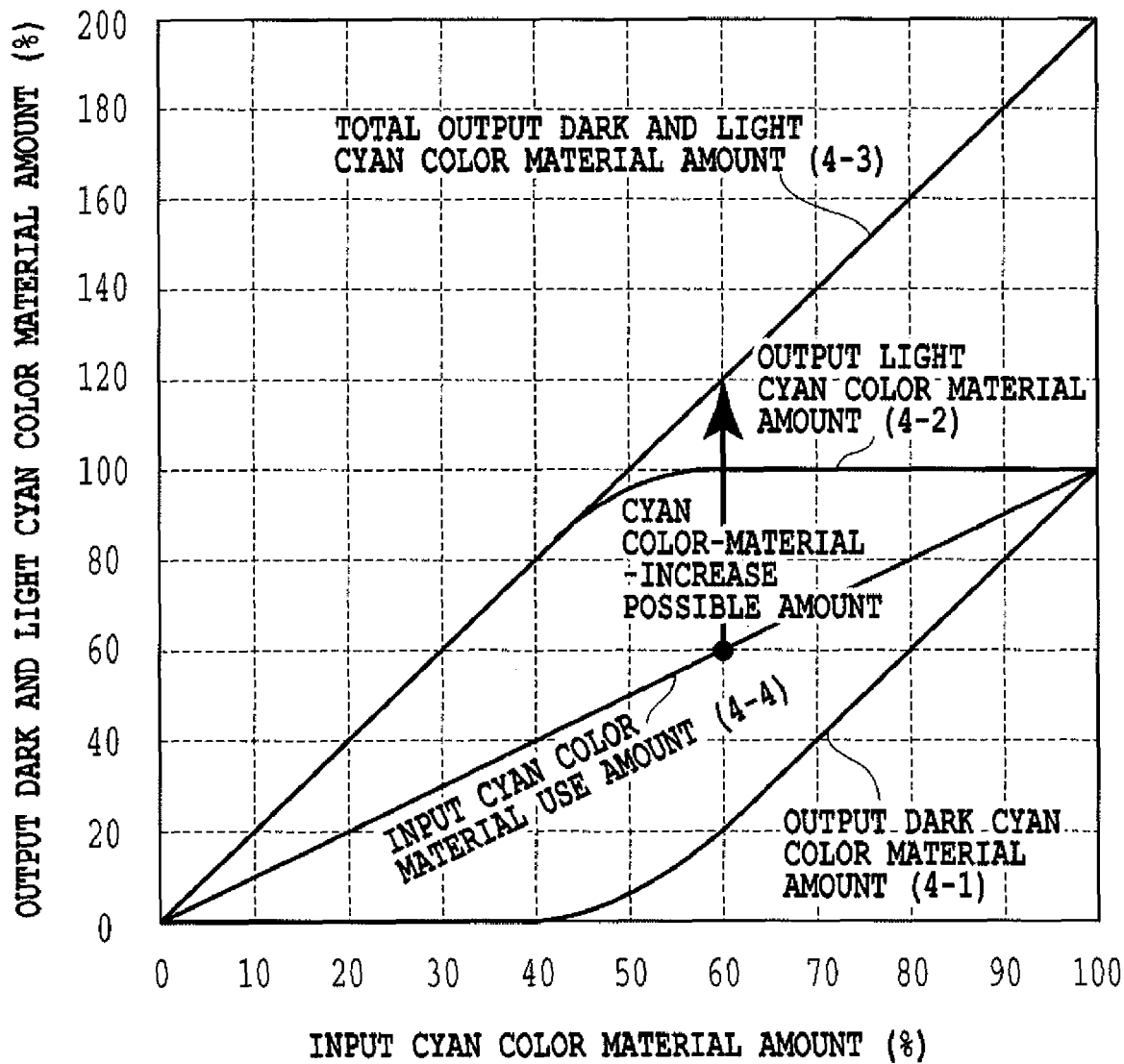
FIG. 4 is a diagram determining a combination amount of dark and light colors in a color material and an increase possible amount of the color material to an input color material amount in the first embodiment of the present invention.

FIG. 4 is a diagram showing a cyan dark and light color separation table of the dark and light color separation table section 302. With this table, a cyan target color material use amount can be determined. A cross patch is printed by a printer and the density is measured by the measuring instrument. In addition, the dark and light color separation table is produced based upon a color material amount characteristics map and a density characteristics map which are produced by the measured value.

Figure 5:
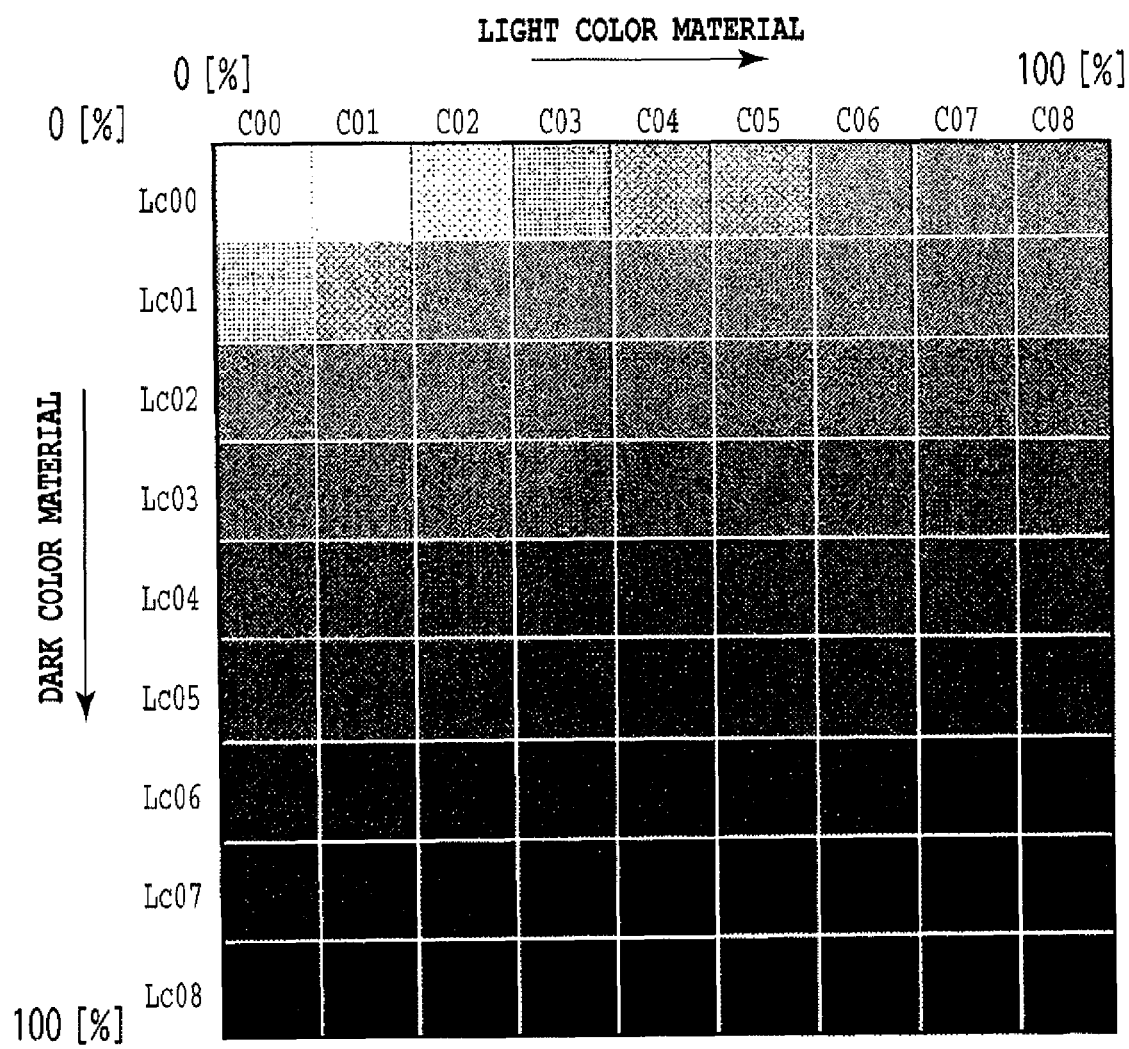
FIG. 5 is a diagram showing a cross patch in the first embodiment of the present invention.

FIG. 5 is a diagram showing one example of a cross patch and is constituted by a patch of 9 lines×9 rows. This cross patch has a patch pattern in which a color material amount (toner amount) of each of a dark cyan color material and a light cyan color material is distributed in a cross pattern to a C color material. In the same figure, a color material amount of the light color material (light color toner) is to increase step by step from left side to right side and a color material amount of the dark color material (dark color toner) is to increase step by step from upper side to lower side. AS for the M color material, it is the same as the above.

Figure 6:
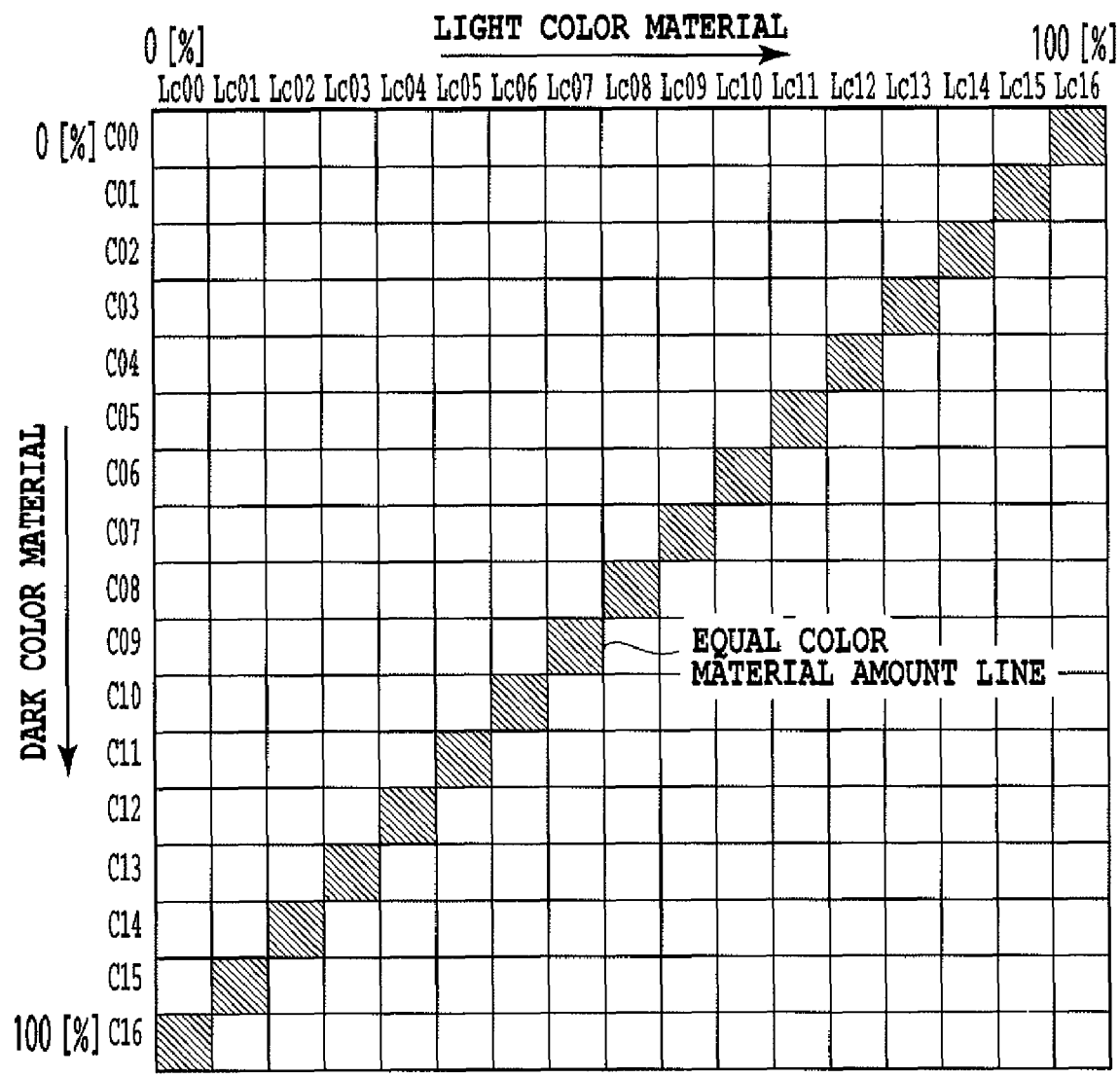
FIG. 6 is a diagram showing color material amount characteristics map in the first embodiment of the present invention.

FIG. 6 is a diagram showing a color material amount characteristics map, which is constituted of cells of 17 lines×17 rows determined by a grid-grid interpolation calculating processing to a discrete toner amount (signal value) of a cross patch. This map enables, even in a case where a value other than a toner amount (signal value) corresponding to a grid is indicated, producing a dark and light color material amount. The same figure shows that, due to characteristics of the cross patch an equal color material amount line can be drawn where a color material amount of a dark color material and that of a light color material are equal and a combination thereof is different.

Figure 7:
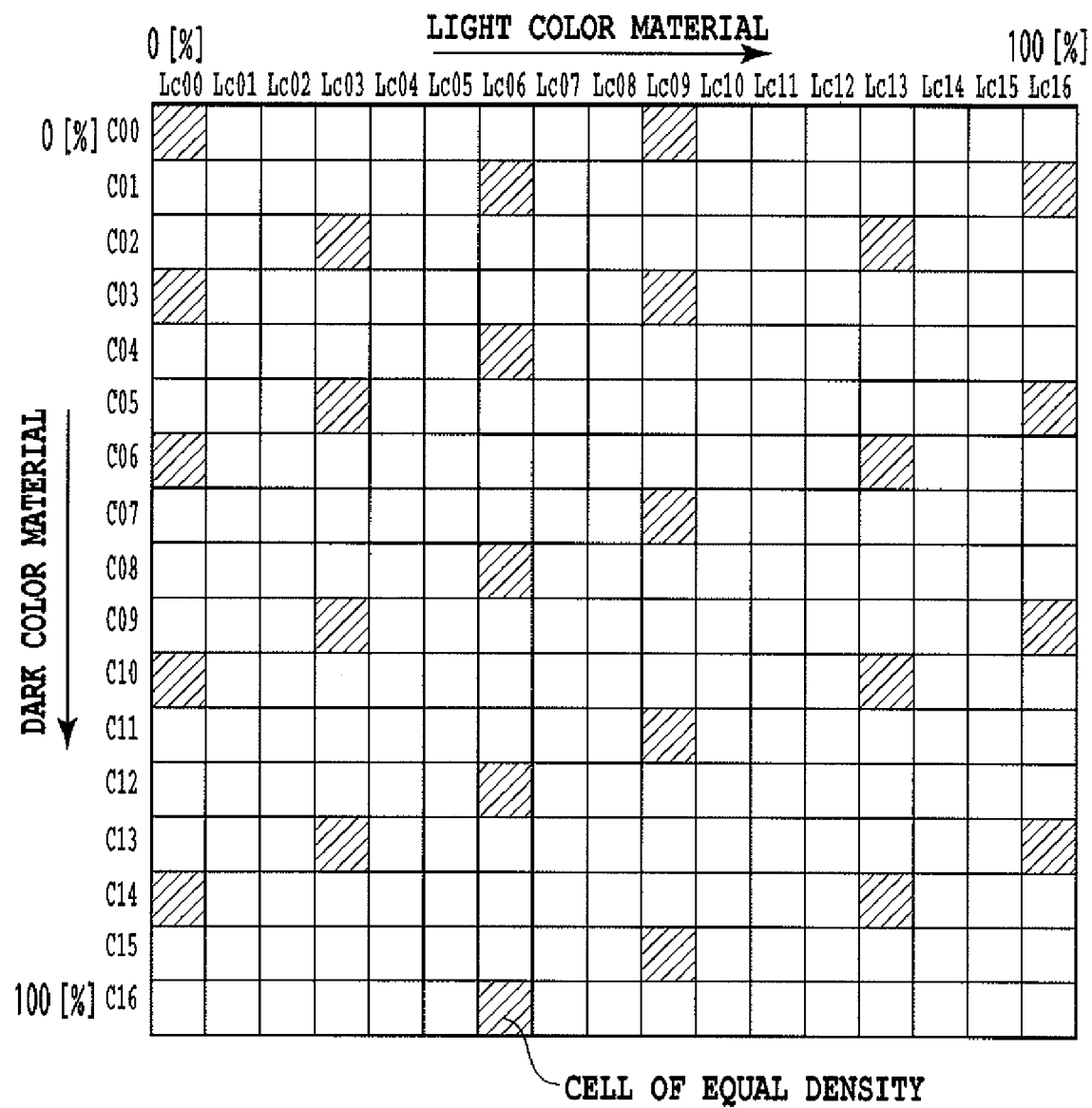
FIG. 7 is a diagram showing a density characteristics map in the first embodiment of the present invention.

FIG. 7 is a diagram showing a density characteristics map. The density characteristics map is made in such a manner that a cross patch in FIG. 5 is printed by a printer and the density of the patch is measured by the measuring instrument, which is then plotted. It should be noted that the density characteristics map is prepared constituted of cells pf 17 lines×17 rows determined by the grid-grid interpolation calculating processing so that even in a case where a value other than a density corresponding to a grid of the cross patch is indicated, a dark and light color material amount can be produced. In addition, an equal density line can be drawn where density of a dark color material and that of a light color material are equal and a combination thereof is different.

Figure 8:
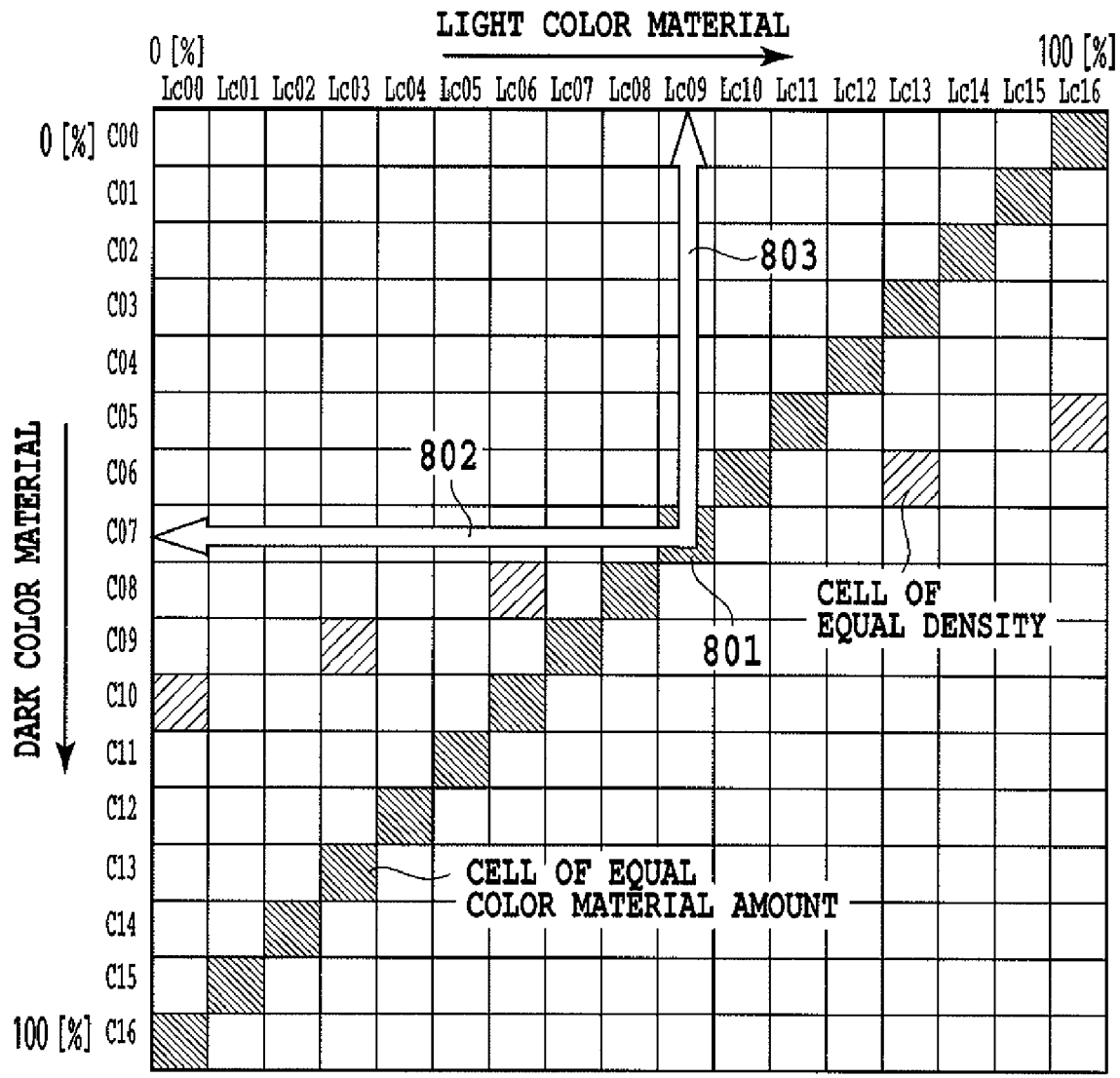
FIG. 8 is a diagram showing a state where the color material amount characteristics map and the density characteristics map are overlapped in the first embodiment of the present invention.
Figure 9:
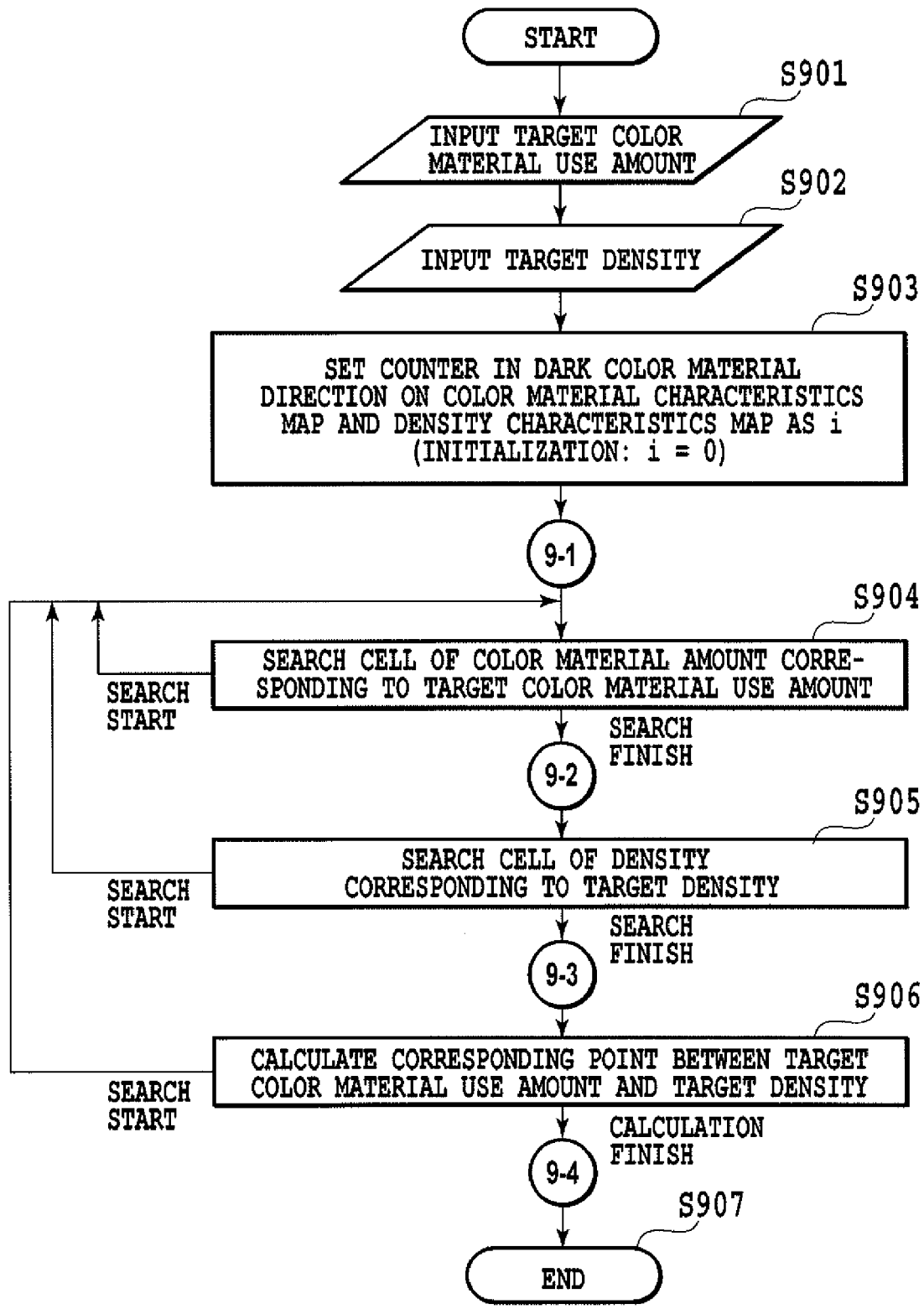
FIG. 9 is a flow chart showing an outline of dark and light color separation processing in the first embodiment of the present invention.

FIG. 8 is a diagram showing a state where a color material amount characteristics map shown in FIG. 6 and a density characteristics map shown in FIG. 7 are overlapped. Each color material amount of a dark color material and a light color material can be determined from an equal color material amount line containing a target color material use amount and an equal density line containing a target density. As for a method of determining each color material amount of a dark color material and a light color material, as shown in FIG. 9, cells 801, where an equal color material amount line containing a target color material use amount intersects an equal density line containing a target density, are detected to determine a color material amount 802 of the dark color material and a color material amount 803 of the light color material.

With regard to the dark and light color separation table produced based upon the above, in FIG. 4, a lateral axis shows an input cyan color material amount and a longitudinal axis shows an output dark and light cyan color material amount. In addition, 4-1 shows an output dark cyan color material amount, 4-2 shows an output light cyan color material amount, 4-3 shows a total output dark and light cyan color material amount produced by addition of 4-1 and 4-2 and 4-4 shows an input cyan color material use amount. In addition, a cyan color-material-increase possible amount (AmtCup) is an amount showing how many input cyan color material use amount (4-4) can be increased until the total output dark and light cyan color material amount (4-3). Accordingly, "AmtCup=Total output dark and light cyan color
material amount−Input cyan color material use
amount", is determined.

FIG. 4 shows a cyan dark and light color separation table. With regard to magenta, similarly "AmtMup=Total output dark and light magenta color
material amount−Input magenta color material
use amount", is determined.

By referring back to FIG. 3, in the total output dark and light color material amount calculating section 301, each of the a cyan target color material use amount (AmtCmax) and a magenta target color material use amount is (AmtMmax) determined by the following calculations based upon the above.

When AmtLIMIT−Amt (C, M, Y, K)>AmtCup+AmtMup, AmtCmax=AmtCup+Amt (C, 0, 0, 0), and AmtMmax=AmtMup+Amt (0, M, 0, 0).

When AmtLIMIT−Amt (C, M, Y, K)<AmtCup+AmtMup, AmtCmax=(AmtLIMIT−Amt (C, M, Y, K))×(AmtCup/(AmtCup+AmtMup))+Amt (C, 0, 0 and 0), and AmtMmax=(AmtLIMIT−Amt (C, M, Y, K))×(AmtMup/(AmtCup+AmtMup))+Amt (0, M, 0, 0).

A cyan dark and light color separation section 304, as explained in FIG. 9 to be described later, determines a combination of each color material amount of dark and light colors from a cyan target color material use amount (AmtCmax) calculated in the total output dark and light color material amount calculating section 301 and a cyan target density calculated in the dark and light color separation table 302. Similarly, a magenta dark and light color separation section 305 determines a combination of each color material amount of dark and light colors from a magenta target color material use amount and a magenta target density calculated in the total output dark and light color material amount calculating section 301.

FIG. 9 is a flow chart showing steps of determining a combination of each color material amount of the dark color material and the light color material, which is executed in an arrangement of the cyan dark and light separation section 304 and the magenta dark and light separation section 305. The processing of the cyan dark and light color separation section 304 will be hereinafter described and the processing of the magenta dark and light color separation section 305 is executed in the same way.

First, step S901 is a step of inputting a cyan target color material use amount calculated in the total output dark and light color material amount calculating section 301. As described above, the total output dark and light color material amount calculating section 301 obtains information on the kind of the recording medium used in the electronic photo printer to calculate the maximum toner amount (hereinafter referred to as "load amount") which the recording medium this information shows can fix. Next, step S902 is a step of inputting a cyan target density. Step S903 is a step of declaring and initializing a counter i in a line on a color material amount characteristics map and a density characteristics map constituted of cells of 17 lines×17 rows. Step S904 is a step of searching a target color material use amount from a color material characteristics map. The searching is, as shown in FIG. 6, made from the color material amount characteristics map constituted of cells of 17 lines×17 rows. It should be noted that the color material amount characteristics map produced by interpolation means can be expanded to cells of, for example, 256 lines×256 rows.

More specially there is performed, based upon a flow chart in FIG. 10 to be described later, search of a cell constituting an equal color material amount corresponding to a target color material use amount in an arrow (solid line) direction shown in the search of a target color material use amount in FIG. 11.

Stop S905 is a step of performing search of a cell constituting a target density from the density characteristics map. The searching is performed from the density characteristics map shown in FIG. 7. It should be noted that the density characteristics map produced by the interpolation means can be expanded to cells of, for example, 256 lines×256 rows.

More specially there is performed, based upon a flow chart in FIG. 12 to be described later, search of a cell constituting an equal density corresponding to a target density in an arrow (broken line) direction shown in the search of a target density in FIG. 13.

Step S906 is a step of calculating intersection points between a target color material use amount and a target density. A cell in which a cell of an equal color material searched in step S904 and a cell of an equal density searched in step S905 correspond is set as each color material amount of a dark color material and a light color material. In addition, a cell in which a position relation between a cell of the equal density and a cell of the equal color material amount is reversed in the same horizontal/vertical line on the map is set as each color material amount of a dark color material and a light color material.

Step S907 is an end step and finishes the dark and light color separation processing.

Figure 10:
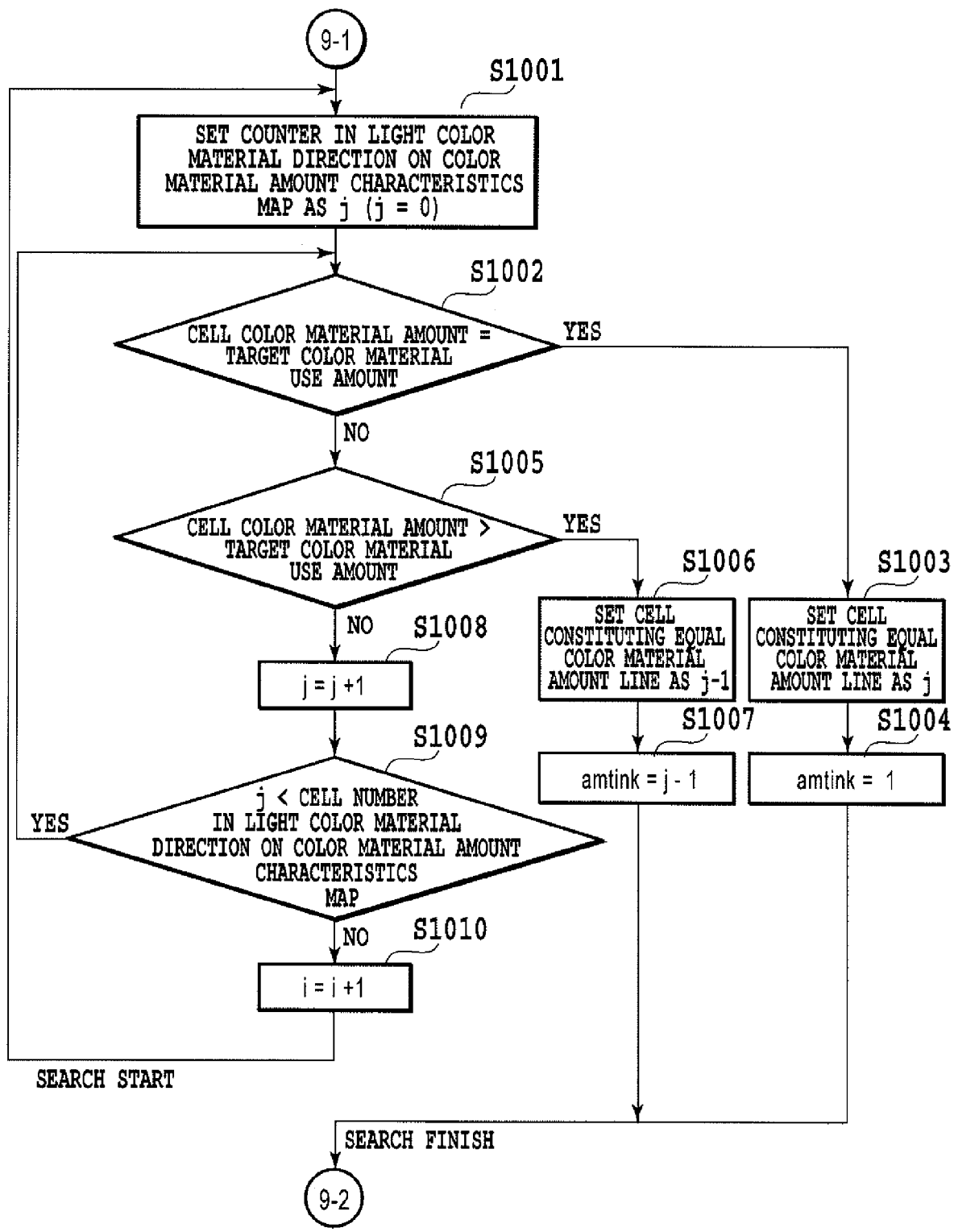
FIG. 10 is a flow chart showing search steps for a target color material use amount in the first embodiment of the present invention.

FIG. 10 is a flow chart for in detail explaining the target color material use amount search step S904 in FIG. 9. Step S1001 declares and initializes a counter j in a row on the color material amount characteristics map constituted of cells of 17 lines×17 rows. Next, step S1002 is a step of determining whether or not a color material amount of a cell constituting an equal color material amount line in the searching and a target color material use amount correspond. When they correspond, the process goes to step S1003. Step S1003 defines a cell constituting an equal color material amount. When the color material amount of the cell in the searching and the target color material use amount correspond, the cell constituting the equal color material amount is set as j. Step S1004 substitutes j to a variant amtink and holds it. Then, the searching finishes.

When they do not correspond in step S1002, the process goes to step S1005. Step S1005 is a step of determining whether or not a color material amount of the cell constituting the equal color material amount in the searching is larger than a target color material use amount. In a case where the determination is YES, the process goes to step S1006. Step S1006 defines the cell constituting the equal color material amount. When the color material amount of the cell constituting the equal color material amount line in the searching is larger than the target color material use amount, the cell constituting the equal color material amount is set as j−1. Step S1007 substitutes j−1 into a variant amtink and holds it. Then, the searching finishes.

When the determination is NO in step S1005, the process goes to step S1008. Step S1008 is a step of executing increment processing of a counter j in a row. Step S1009 is a step of determining whether or not the counter j has reached the last cell in the row. When the counter j has not reached the last cell in the row, the process goes back to step S1002 to search a cell constituting the target color material use amount again. When the step S1009 determines that the counter j has reached the last cell in the row, the process goes to step S1010. Then, after the increment processing of the counter i in the line is executed, the process goes back to step S1001 to start search of the cell constituting the target color material use amount again.

Figure 11:
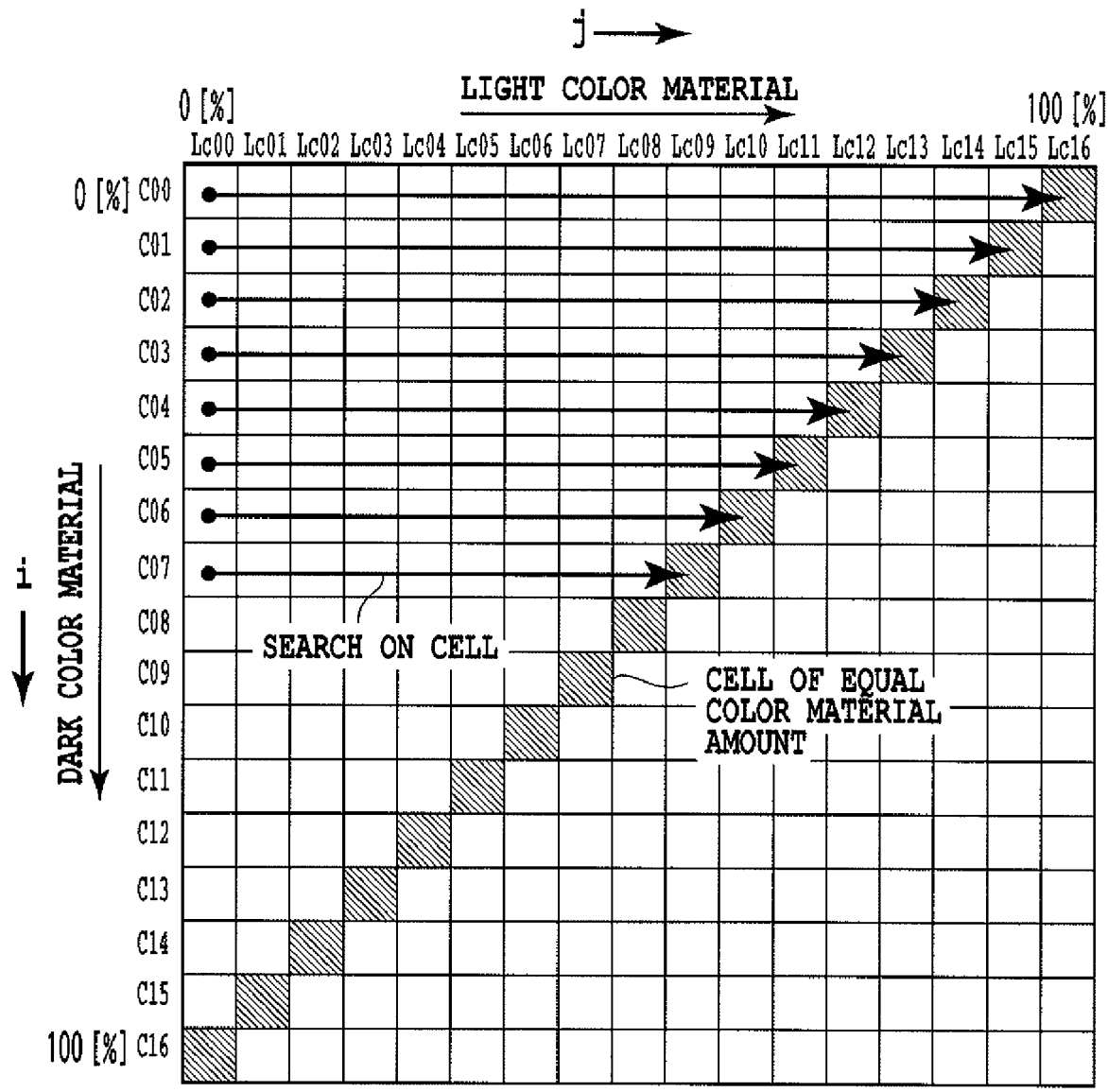
FIG. 11 is a diagram showing a search approach for a target color material use amount in the first embodiment of the present invention.

FIG. 11 is a diagram of explaining a search approach of a target color material use amount. In the same figure, there is performed search of a cell constituting an equal color material amount corresponding to a target color material use amount in an arrow direction (solid line) shown in the search of the target color material use amount. It should be noted that in the first embodiment, the counter i is defined as an arrow direction of the dark color material and the counter j in the row is defined as an arrow direction of the light color material in the same figure.

Figure 12:
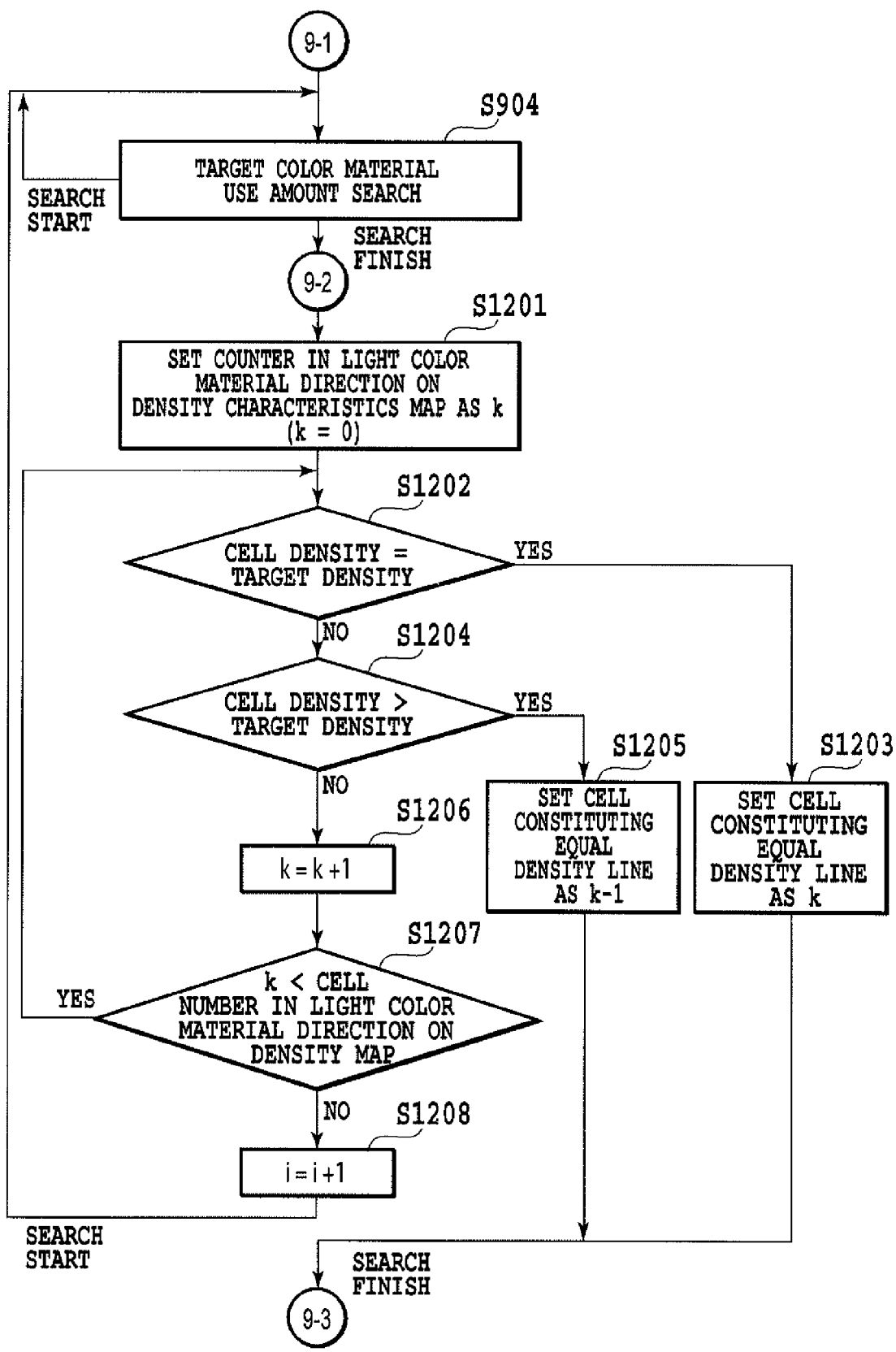
FIG. 12 is a flow chart showing search steps for a target density in the first embodiment of the present invention.

FIG. 12 is a flow chart for in detail explaining the target density search step S905 in FIG. 9. First, step S904 is a step of searching the target color material use amount shown in FIG. 10. When the target color material use amount is found, continuously, the process goes to step S1201. When it is not found, the target color material use amount is again searched. Step S1201 declares and initializes a counter k in a row in the density characteristics map constituted of cells of 17 lines×17 rows. Step S1202 is a step of determining whether or not a density of a cell constituting an equal density in the searching corresponds to a target density. When they correspond, the process goes to step S1203. Step S1203 defines a cell constituting an equal density. When the density of the cell constituting the equal density in the searching and the target density correspond, the cell constituting the equal density is set as k. In addition, intersection points between the target color material use amount and the target density are calculated.

When they do not correspond in step S1202, the process goes to step S1204. Step S1204 is a step of determining whether or not a density of a cell constituting the equal density in the searching is larger than a target density. In a case where the determination is YES, the process goes to step S1205.

Step S1205 defines the cell constituting the equal density. When the density of the cell constituting the equal density in the searching is larger than the target density, the cell constituting the equal density is set as k−1. Then, intersection points between the target color material use amount and the target density are calculated.

When the determination is NO in step S1204, the process goes to step S1206. Step S1206 is a step of executing increment processing of a counter k in a row. Step S1207 is a step of determining whether or not the counter k has reached the last in the row. When the counter k has not reached the last in the row, the process goes back to step S1202 to search a cell constituting the target density again. When the step S1207 determines that the counter k has reached the last in the row, the process goes to step S1208. Then, after the increment processing of the counter i in the line is executed, search of the target color material use amount is again started.

Figure 13:
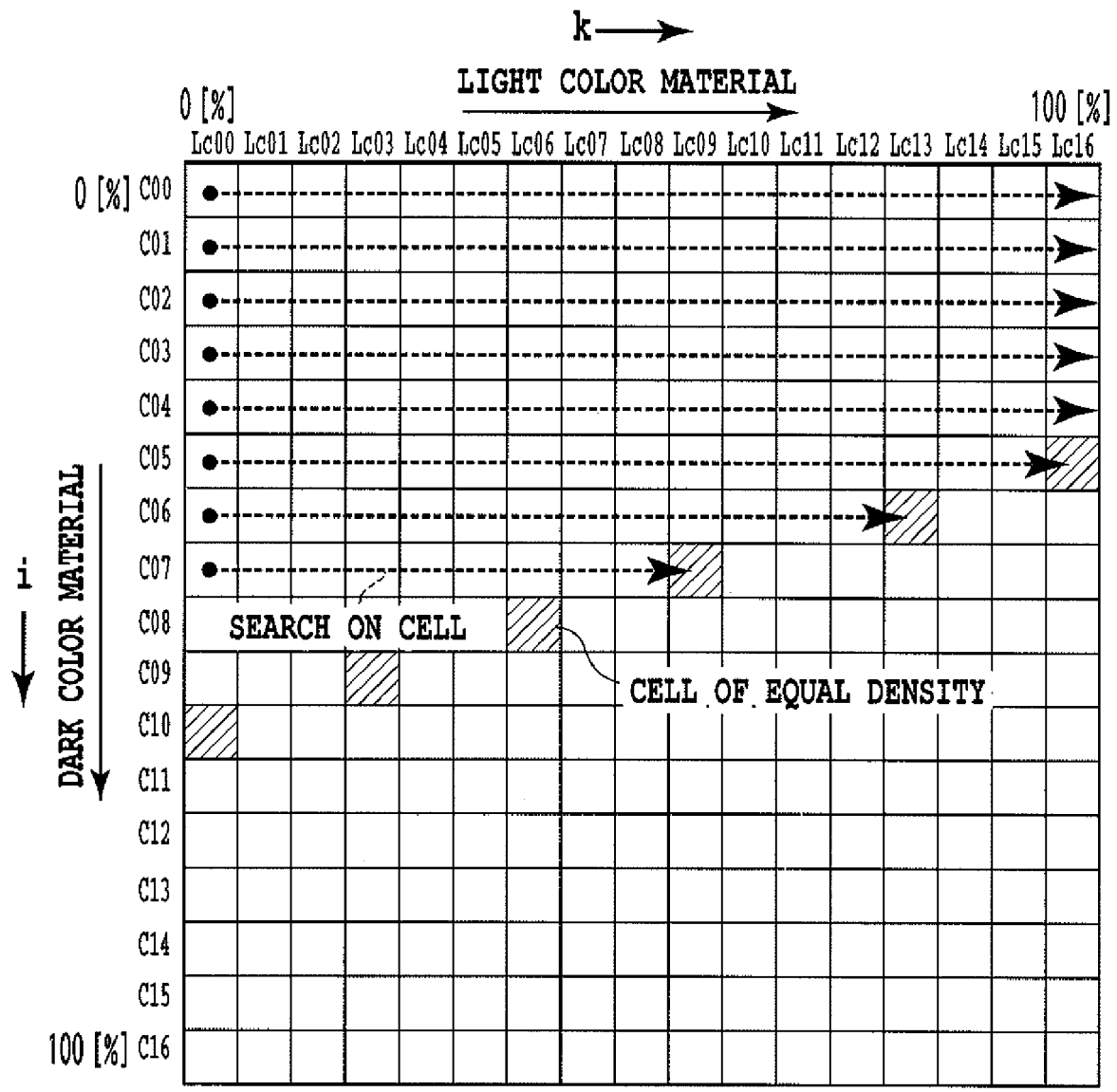
FIG. 13 is a diagram showing a search approach for a target density in the first embodiment of the present invention.

FIG. 13 is a diagram of explaining a search approach of a target density. In the same figure, there is performed search of a cell constituting an equal density corresponding to a target density in an arrow direction (broken line) shown in the search of the target density. It should be noted that in the first embodiment, the counter i in a line is defined as an arrow direction of the dark color material and the counter k in a row is defined as an arrow direction of the light color material in the same figure.

Figure 14:
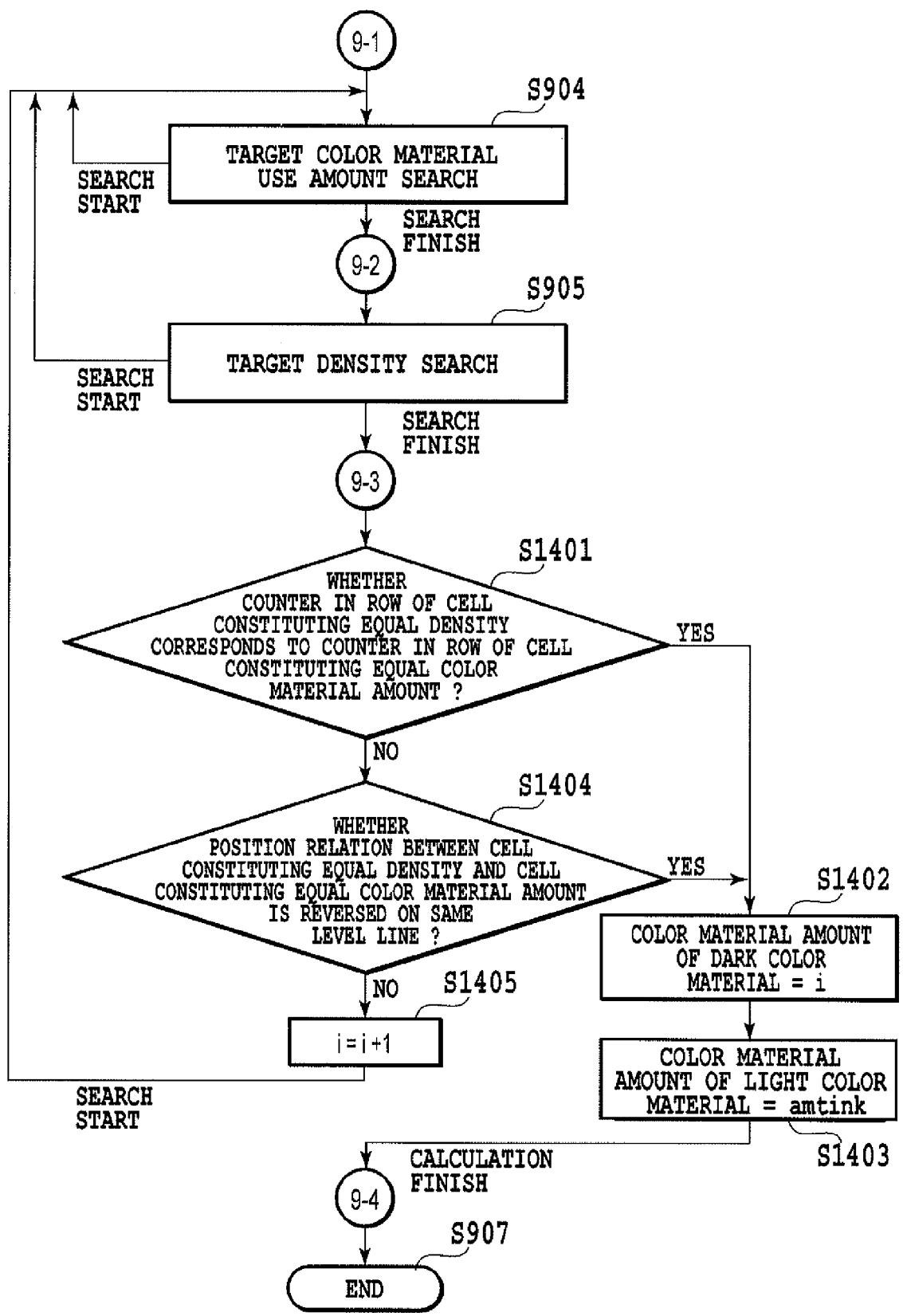
FIG. 14 is a flow chart showing steps for calculating a corresponding point between a target color material amount use amount and a target density in the first embodiment of the present invention.

FIG. 14 is a flow chart for explaining the intersection point calculation step S906 between the target color material use amount and the target density in FIG. 9. First, step S904 is a step of searching the target color material use amount shown in FIG. 10. When the target color material use amount is found, continuously, the process goes to step S905, wherein the target density shown in FIG. 12 is searched. When it is not found, the target color material use amount is again searched. Step S905 is a step of searching the target density. When the target density is found, the process goes to step S1401. When the target density is not found, the search again starts from the target color material use amount. Step S1401 is a step of determining whether or not a counter in a row of a cell constituting an equal density corresponds to a counter in a row of a cell constituting an equal color material amount. A case where they correspond shows a state of a cell 1503 where, as will be in detail described later in FIG. 15, the equal density and the equal color material amount exist on the same cell. At this point, C07 shown in an arrow 1504 becomes a color material amount of the dark color material and Lc09 shown in an arrow 1505 becomes a color material amount of the light color material.

By referring back to FIG. 14, in a case when they correspond in step S1401, the process goes to step S1402, wherein a counter i of the then-line is set as a color material amount of the dark color material and the process goes to step S1403. Then, a counter amtink in the row held in FIG. 10 is set as a color material amount of the light color material. Then, the process goes to step S907, wherein the program finishes.

When it is determined in step S1401 that they do not correspond, the process goes to step S1404. Step S1404 is a step of determining whether or not a position relation between a cell constituting the equal density and a cell constituting the equal color material amount is reversed. A state when the position relation between the cells is reversed means, as described later in FIG. 16, a state where the position relation between the cells constituting the equal density line around the equal color material amount line in the horizontal line in a range of from C07 to C08. In the case of considering a load amount, a cell 1603 is the optimal sell and at this point, a combination of a color material amount in each of the dark color material and the light color material is made in such a manner that C08 shown in an arrow 1604 is set as a color material amount of the dark color material and next, Lc08 shown in an arrow 1605 is set as a color material amount of the light color material.

By referring back to FIG. 14, in a case when the position relation is reversed in step S1404, the process goes to step S1402, wherein a counter i of the then-line is set as a color material amount of the dark color material and the process goes to step S1403. Then, a counter amtink in the row held in FIG. 10 is set as a color material amount of the light color material. Then, the process goes to step S907, wherein the program finishes.

When it is determined in step S1404 that the position relation is not reversed, the process goes to step S1405, wherein, after executing the increment processing of the counter i in the line, the process goes back to step S904 to start search of the target color material use amount again. Then, a series of the steps of determining a color material amount of each of the dark color material and the light color material in the dark and light color separation continue to be executed until the sell is found. The program finishes when the sell is found.

Figure 15:
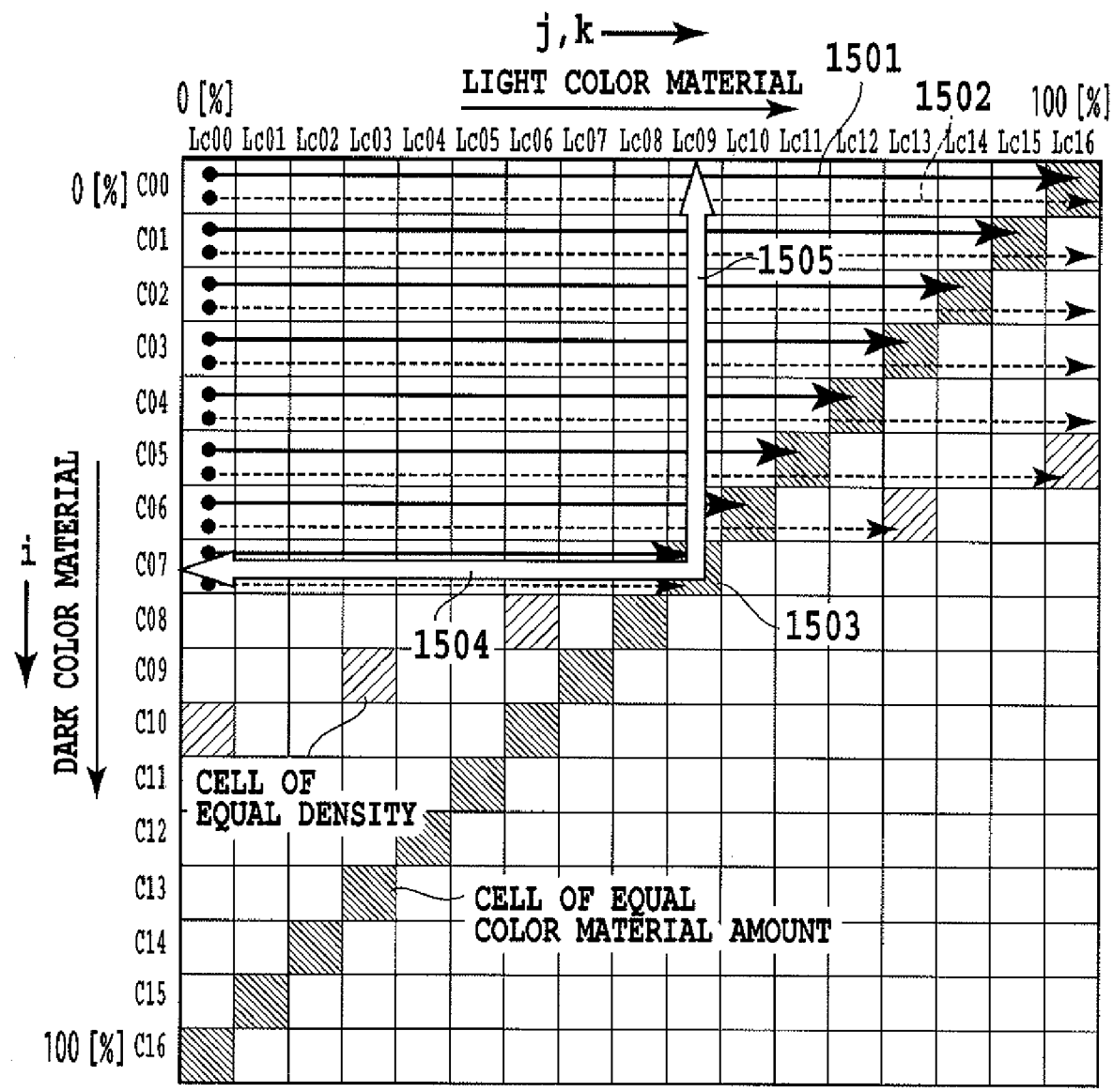
FIG. 15 is a diagram explaining a condition where a cell constituting an equal density and a cell constituting equal color material amount correspond in the first embodiment of the present invention.

FIG. 15 is a diagram showing a state where a cell constituting an equal density corresponds to a cell constituting an equal color material amount. The search is performed from a color material amount 0% of the light color material to a direction where the color material amount increases, setting as a search starting point a cell (C00, Lc00) having a color material amount 0% of the dark color material and the color material amount 0% of the light color material. An arrow 1501 (solid line) is search of a target color material use amount and the search on the target color material use amount is performed in the arrow direction. In addition, an arrow 1502 (broken line) is search of a target density and the search on the target density is performed in the arrow direction. During a little while after the search has started, an equal density line containing the target density does not exist on a map (a state where a counter i exists in a range of from C00 to C04), and the search continues to be performed until a cell constituting an equal color material amount and a cell constituting an equal density exist on the same horizontal line. When the counter i reaches C05, a cell (C05, Lc11) constituting the equal color material amount and a cell (C05, Lc16) constituting the equal density exist for the first time on the search direction line and the intersection points are calculated. Afterwards, the state where the position relation between the cell constituting the equal density and the cell constituting the equal color material amount does not change on the same line continues until the counter i goes to C06. Therefore, continuously the search starts. In addition, when the counter i goes to C07, the cell constituting the equal density and the cell constituting the equal color material amount exist on the cell 1503 (C07, Lc09). At this point, C07 shown in an arrow 1504 is set as a color material amount of the dark color material and Lc09 shown in an arrow 1505 is set as a color material amount of the light color material. Subsequently, when the counter i goes to C08, the position relation between the cells constituting the equal density line around the equal color material amount line is reversed. Afterwards, the state where the position relation between the cell constituting the equal density and the cell constituting the equal color material amount does not change continues again until the counter i goes to C10. Thereafter, the equal density line containing the target density will disappear on the map.

Figure 16:
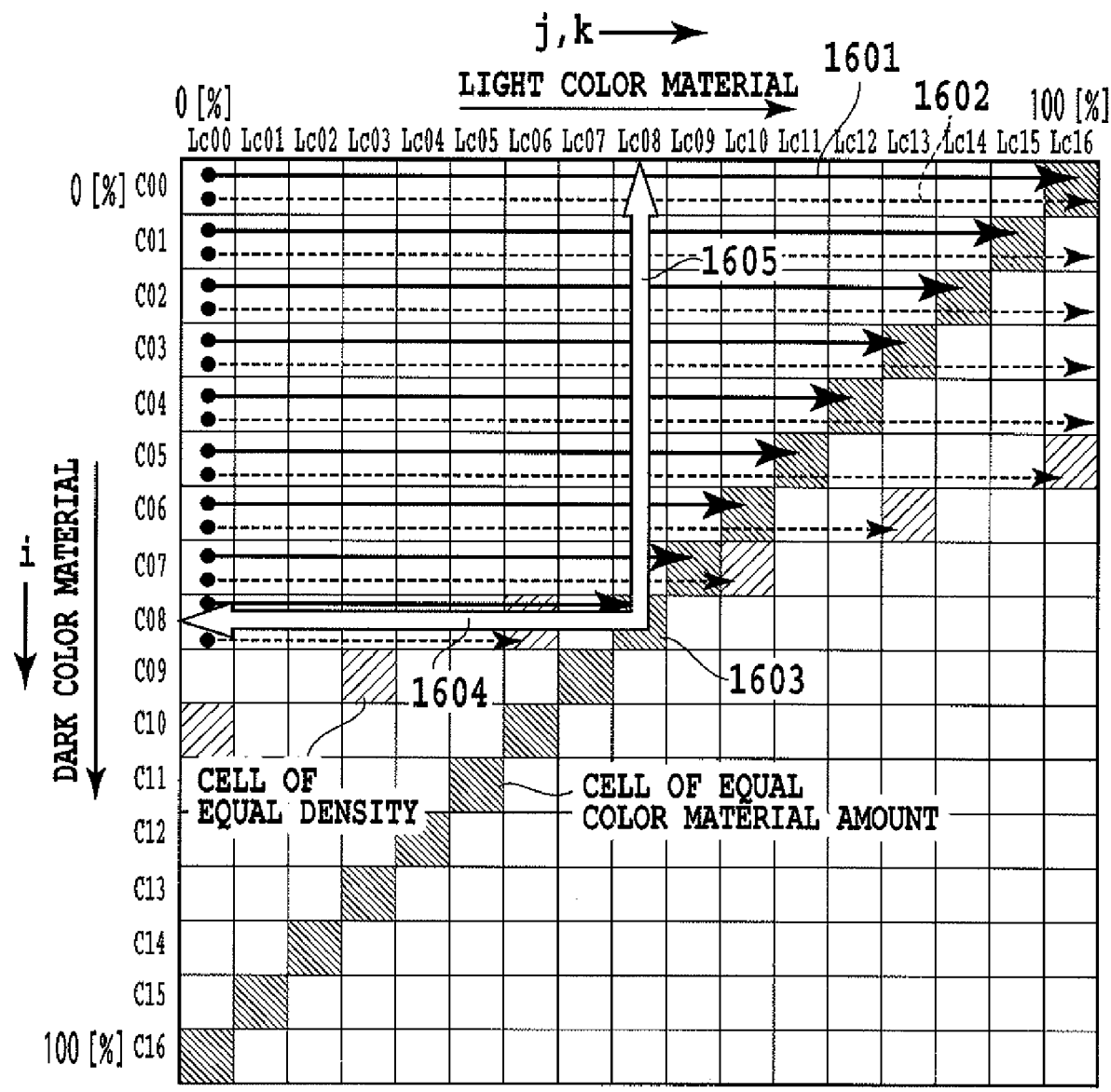
FIG. 16 is a diagram explaining a condition where a cell constituting an equal density and a cell constituting equal color material amount do not correspond in the first embodiment of the present invention.

FIG. 16 is a diagram showing a state where a cell constituting an equal density does not correspond to a cell constituting an equal color material amount. Similarly in FIG. 15, the search is performed from a color material amount 0% of the light color material to a direction where the color material amount increases, setting as a search starting point the cell (C00, Lc00). An arrow 1601 (solid line) is search of a target color material use amount and the search on the target color material use amount is performed in the arrow direction. In addition, an arrow 1602 (broken line) is search of a target density and the search on the target density is performed in the arrow direction. During a little while after the search ha started, an equal color material amount containing the target density does not exist on a map (a state where a counter i exists in a range of from C00 to C04), and the search continues to be performed until a cell constituting an equal color material amount and a cell constituting an equal density exist on the search direction line. When the counter i reaches C05, a cell (C05, Lc11) constituting the equal color material amount and a cell (C05, Lc16) constituting the equal density exist on the search direction line for the first time and the intersection points are calculated. Afterwards, the state where the position relation between the cell constituting the equal density and the cell constituting the equal color material amount does not change continues until the counter i goes to C07. Therefore, continuously the search starts. In addition, when the counter i goes to C08, the position relation between the cells constituting the equal density line around the equal color material amount line is reversed.

Here, there is a case where the cell constituting the equal density does not correspond to the cell constituting the equal color material amount. In this case, for determining a combination of each color material amount in the dark color material and a color material amount of the light color material, the cell constituting the equal color material amount is required to be in close proximity to the cell constituting the equal density. Further in considering the load amount, since a value of the cell constituting the equal density is smaller than that of the cell constituting the equal color material amount, the cell constituting the equal density is required to be positioned in the left side to the equal color material amount line as an axis. Therefore, the cell 1603 (C08, Lc08) is the optimal sell under the above condition. In a combination of each color material amount of the dark color material and the light color material, C08 shown in an arrow 1604 is set as a color material amount of the dark color material and Lc08 shown in an arrow 1605 is set as a color material amount of the light color material. Afterwards, the state where the position relation between the cell constituting the equal density and the cell constituting the equal color material amount does not change continues again until the counter i goes to C10. Then, the equal density line containing the target density will disappear on the map.

As described above, in a dark and light color material amount separation image processing method of separating in color the dark color material into two kinds of dark and light color materials containing the light color material, a cross patch of 9 lines×9 rows where a discrete color material amount with regard to two kinds of color materials having a different density is distributed in a cross pattern is printed by an image output device such as a printer. Then, a density characteristics map constituted of cells of 17 lines×17 rows is produced by interpolating a discrete density value obtained by measuring the printed material in color with the interpolation means. In addition, a color material amount characteristics map constituted of cells of 17 lines×17 rows is produced by interpolating a discrete color material amount of the cross patch with the interpolation means. Accordingly, the cell of the equal color material amount is searched within a range not exceeding a target color material use amount from the color material amount characteristics map and the cell of the equal density is searched within a range not exceeding a target density from the density characteristics map. As a result, it is possible to detect a cell where the equal color material amount and the equal density correspond. Accordingly, a search method of determining a color material amount of each of dark and light colors can be provided.

It should be noted that in the first embodiment, light cyan and light magenta are used as a light color material, but a color separation method of converting a dark color material into a color material signal containing a further other light color material, for example, light yellow or light black may be provided.

Second Embodiment

As described above, the present invention provides a search method of determining a color material amount of each of dark and light colors to determine a combination of a dark toner amount and a light toner amount, but can achieve further higher speeds of a dark and light color separation by performing search in a different approach.

The process in an outline of a dark and light color separation processing is basically the same as in FIG. 9 shown in the first embodiment. Accordingly, hereinafter step S904, step S905 and step S906 will be explained.

Figure 17:
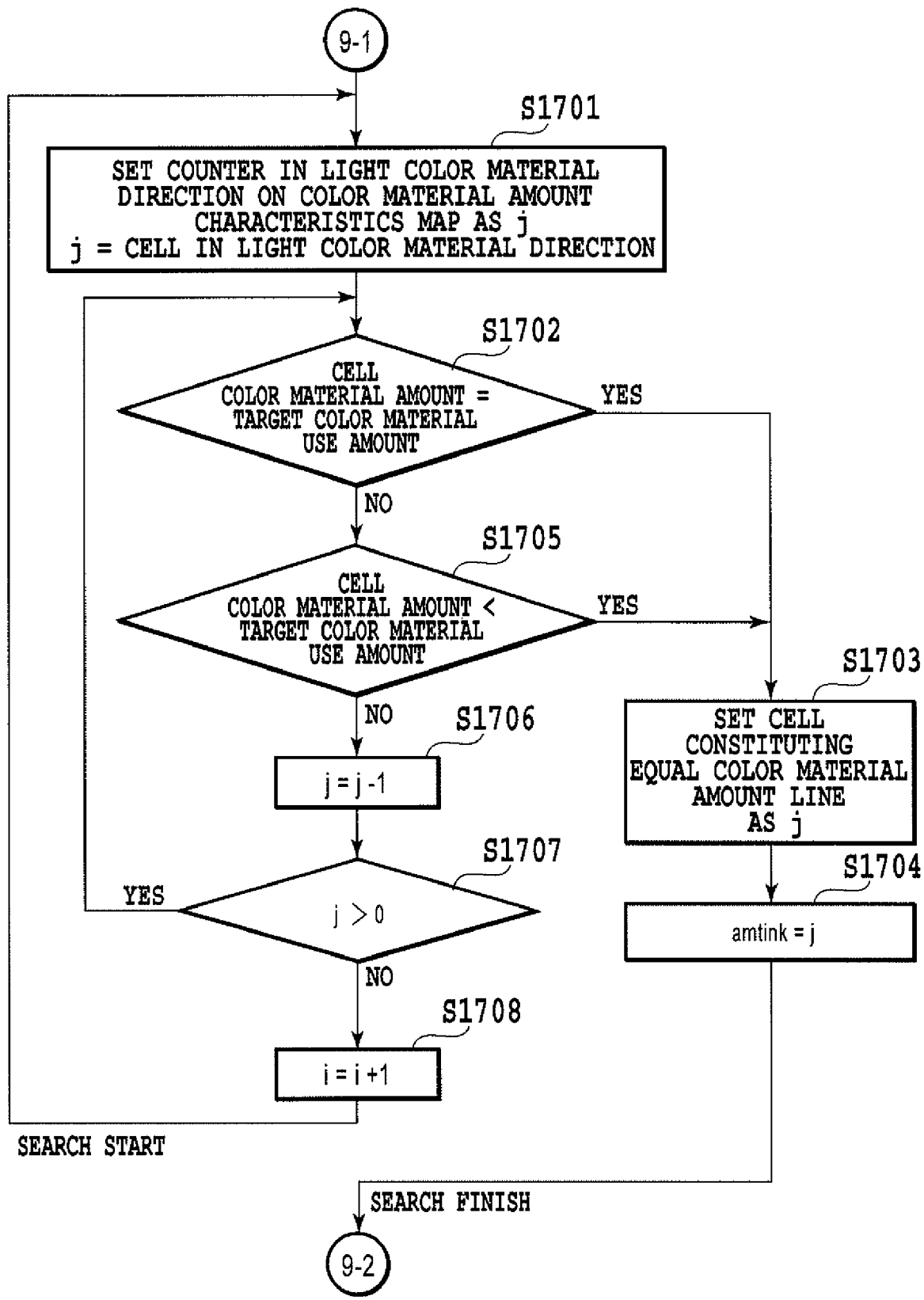
FIG. 17 is a flow chart showing search steps for a target color material use amount in a second embodiment of the present invention.

FIG. 17 is a flow chart for in detail explaining step S904 of a target color material use amount search in FIG. 9 in the case of aiming at high speeds. Step S1701 declares and initializes a counter j in a row on the color material amount characteristics map constituted of cells of 17 lines×17 rows. Next, step S1702 is a step of determining whether or not a color material amount of a cell constituting an equal color material amount in the searching and a target color material use amount correspond. When they correspond, the process goes to step S1703. Step S1703 defines a cell constituting an equal color material amount line. When the color material amount of the cell constituting the equal color material amount line in the searching and the target color material use amount correspond, the cell constituting the equal material amount line is set as j. Step S1704 substitutes j into a variant amtink and holds it. In addition, the process goes to step S905, wherein continuously the search on the target density is performed. When they do not correspond in step S1702, the process goes to step S1705. Step S1705 is a step of determining whether or not a color material amount of a cell constituting the equal color material amount in the searching is smaller than a target color material use amount. In a case where the determination os YES, the process goes to step S1703. Step S1703 defines the cell constituting the equal color material amount. When the color material amount of the cell constituting the equal color material amount in the searching is smaller than the target color material use amount, the cell constituting the equal color material amount is set as j. Step S1004 substitutes j into a variant amtink and holds it. Then, the process goes to step S905, wherein continuously the search on the target density is performed.

In a case where the determination is NO, the process goes to step S1706. Step S1706 is a step of executing decrement processing of a counter j in a row. Step S1707 is a step of determining whether or not the counter j has reached the first cell in the row. In a case where the counter j has not reached the first cell in the row, the process goes back to step S1702, wherein the target color material use amount is again searched. In a case where the counter j has reached the first cell in the row in step S1707, the process goes to step S1708, wherein increment processing of a counter i in a line is executed. Then the process goes back to step S1701, wherein the search of the target color material use amount starts again.

Figure 18:
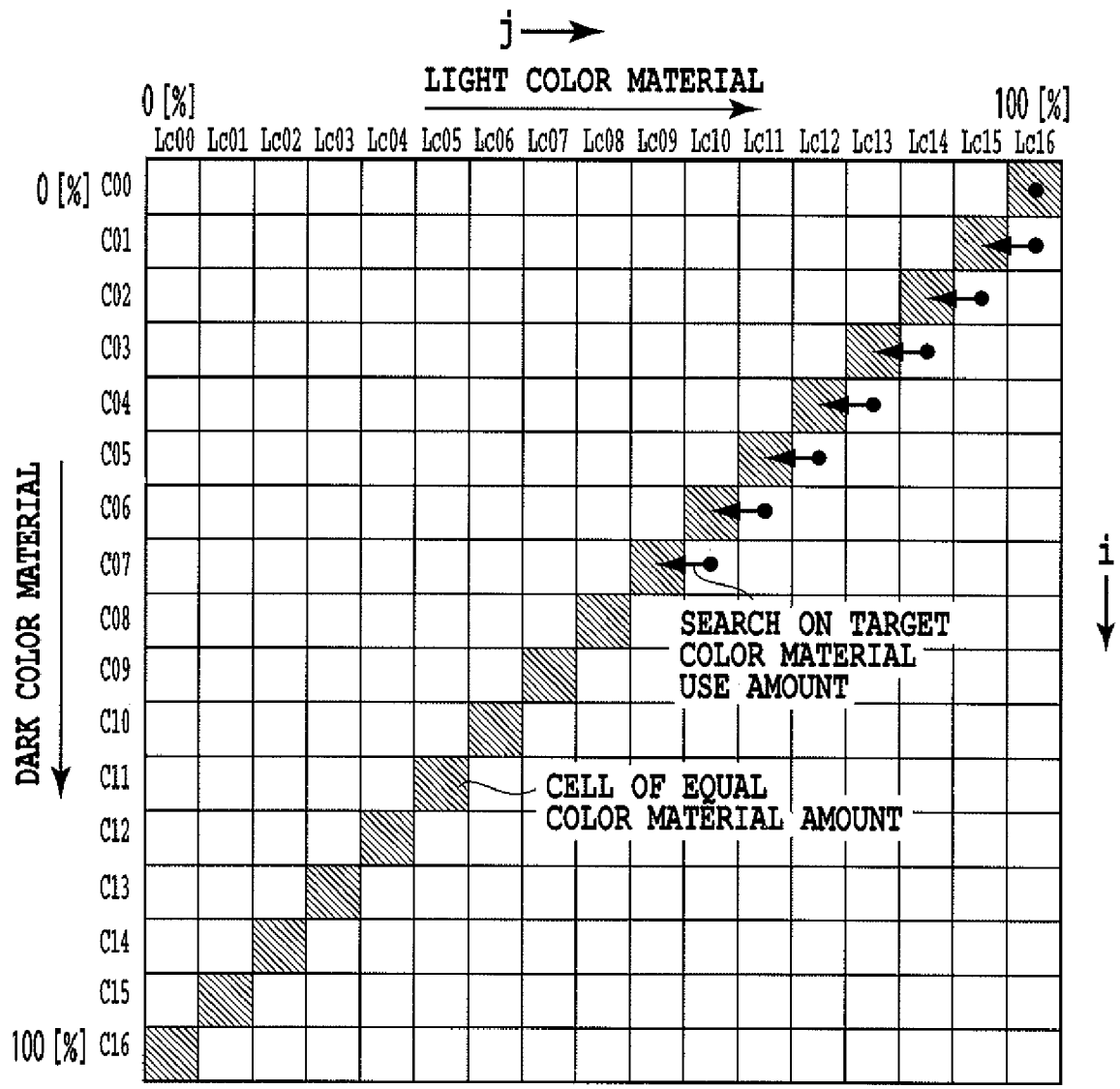
FIG. 18 is a diagram showing a search approach for a target color material use amount in the second embodiment of the present invention.

FIG. 18 is a diagram of explaining an approach of a target color material use amount search. There is performed search of a cell constituting an equal color material amount corresponding to a target color material use amount in an arrow direction (solid line) shown in the search of the target color material use amount. It should be noted that the counter i is defined as an arrow direction of the dark color material and the counter j in the row is defined as an arrow direction of the light color material.

Figure 19:
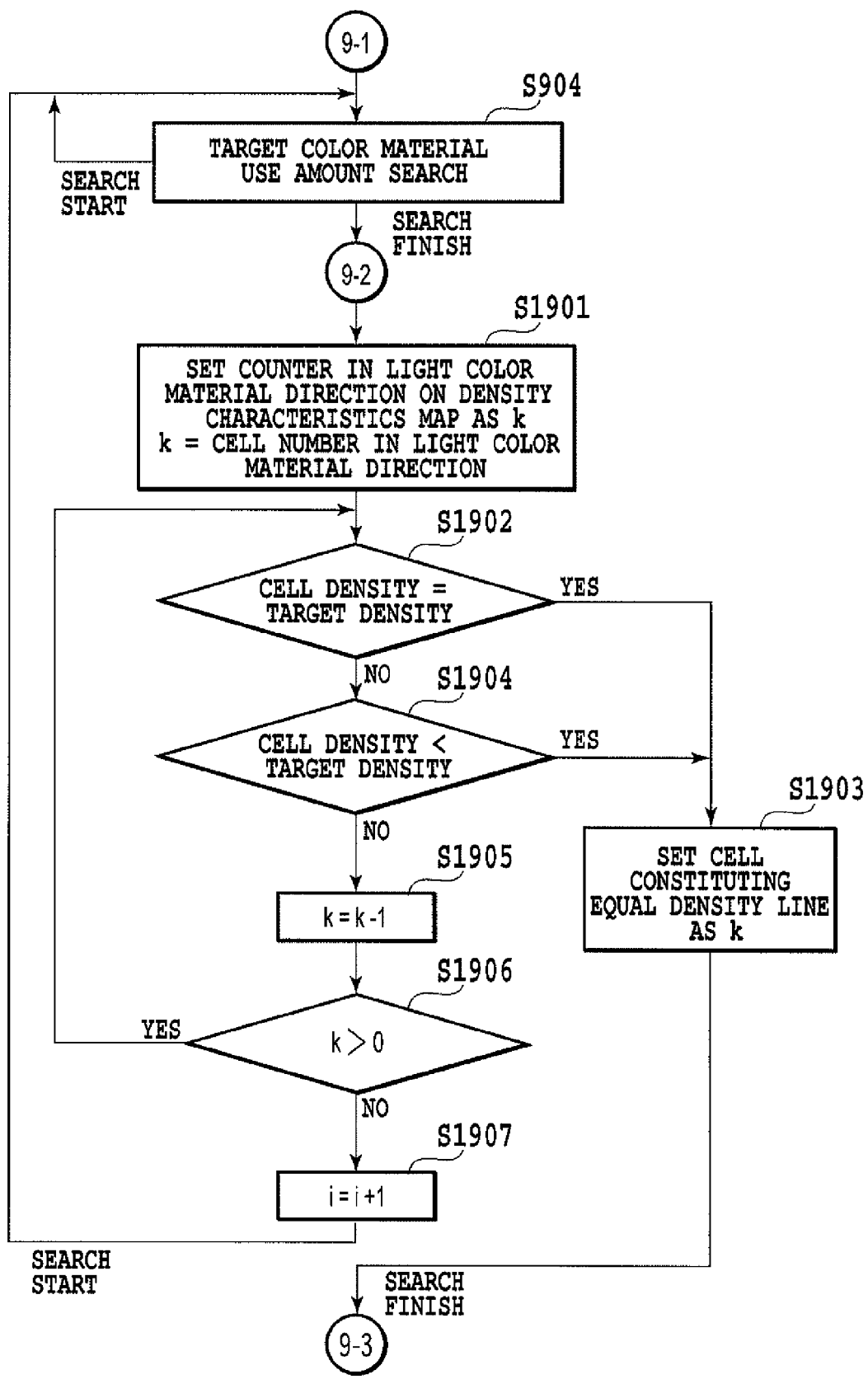
FIG. 19 is a flow chart showing search steps for a target density in the second embodiment of the present invention.

FIG. 19 is a flow chart for in detail explaining step S905 of a target density search in the case of aiming at high speeds. First, step S904 is a step of searching the target color material use amount shown in FIG. 17. In a case when the target color material use amount is found, the process goes to step S1901. In a case when the target color material use amount is not found, the target color material use amount is again searched. Step S1901 declares and initializes a counter k in a row on the density characteristics map constituted of cells of 17 lines×17 rows. Step S1902 is a step of determining whether or not a density of a cell constituting an equal density line in the searching and a target density correspond. When they correspond, the process goes to step S1903. Step S1903 defines a cell constituting an equal density line. When the density of the cell constituting the equal density line in the searching and the target density correspond, the cell constituting the equal density line is set as k. In addition, the process goes to step S906, wherein continuously, the intersection points between the target color material amount and the target density are calculated. When they do not correspond in step S1902, the process goes to step S1904. Step S1904 is a step of determining whether or not a density of a cell constituting the equal density line in the searching is smaller than a target density. In a case where the determination is YES, the process goes to step S1903, wherein the cell constituting the equal density is set ask. In addition, the process goes to step S906, wherein it is continuously determined whether or not the target color material use amount corresponds to the cell of the target density. In a case where the determination is NO, the process goes to step S1905. Step S1905 is a step of executing decrement processing of a counter k in a row. Step S1906 is a step of determining whether or not the counter k has reached the first cell in the row. In a case where the counter k has not reached the first cell in the row, the process goes back to step S1902, wherein the target density is again searched. In a case where the counter k has reached the first cell in the row in step S1906, the process goes to step S1907, wherein increment processing of a counter i in a line is executed. Thereafter, the process goes back to step S1904, wherein the search of the target color material use amount starts again.

Figure 20:
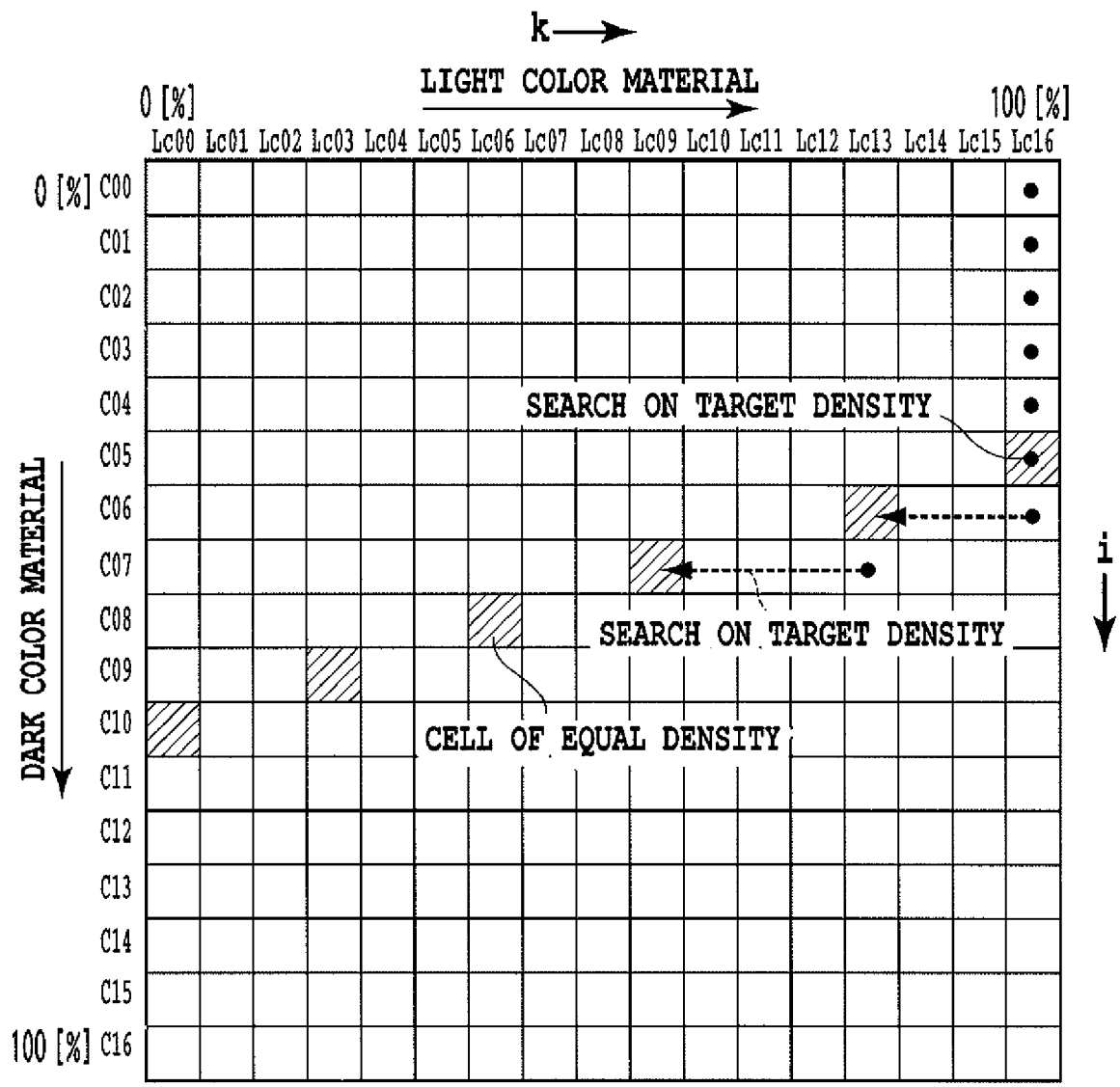
FIG. 20 is a diagram showing a search approach for a target density in the second embodiment of the present invention.

FIG. 20 is a diagram of explaining an approach of a target density search in aiming at high speeds. There is performed search of a cell constituting an equal density corresponding to a target density in an arrow direction (broken line) shown in the search of the target density. It should be noted that the counter i in a line is defined as an arrow direction of the dark color material and the counter k in a row is defined as an arrow direction of the light color material.

The determination on whether or not a target color material use amount and a target density correspond in aiming at high speeds is the same as in FIG. 14.

Figure 21:
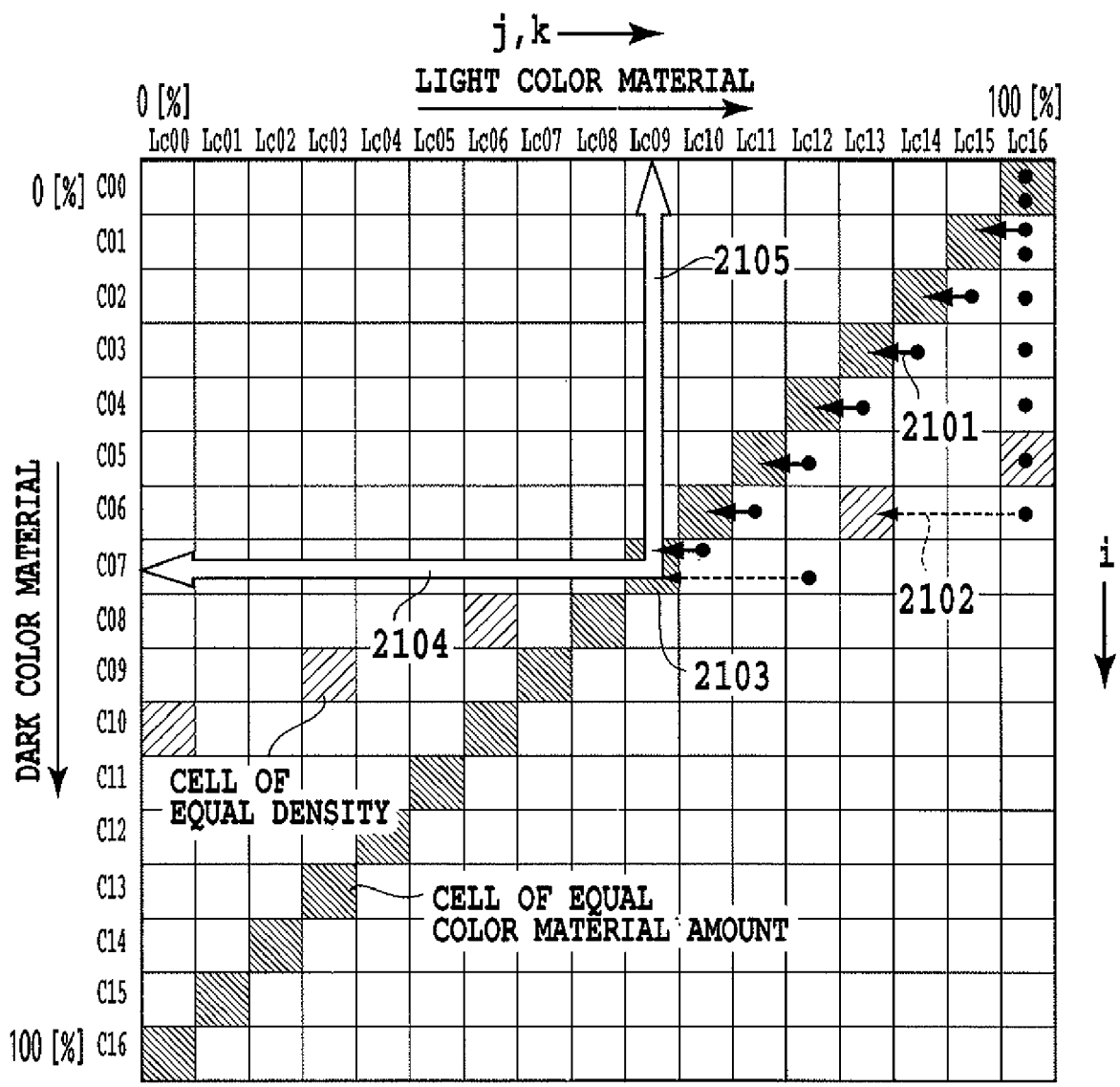
FIG. 21 is a diagram explaining a condition where a cell constituting an equal density and a cell constituting equal color material amount correspond in the second embodiment of the present invention.

FIG. 21 is a diagram explaining a state where a cell constituting an equal density corresponds to a cell constituting an equal color material amount in aiming at high speeds. The search is performed from a maximum color material amount of the light color material to a direction where the color material amount decreases, setting as a search starting point a cell (C00, Lc16) having a color material amount 0% of the dark color material and the maximum color material amount of the light color material. An arrow 2101 (solid line) is search of a target color material use amount and the search of the target color material use amount is performed in the arrow direction. In addition, an arrow 2102 (broken line) is search of a target density and the search of the target density is performed in the arrow direction. During a little while after the search has started, a cell of an equal density containing the target density does not exist on a map (a state where a counter i exists in a range of from C00 to C04), and the search continues to be performed until a cell constituting an equal color material amount and a cell constituting an equal density exist on the search direction line. When the counter i reaches C05, a cell (C05, Lc11) constituting the equal color material amount and a cell (C05, Lc16) constituting the equal density exist on the same line for the first time and the intersection points are calculated. Afterwards, the state where the position relation between the cell constituting the equal density and the cell constituting the equal color material amount does not change on the same line continues until the counter i goes to C06. Therefore, continuously the search starts. In addition, when the counter i goes to C07, there occurs a state where the cell constituting the equal density and the cell constituting the equal color material amount exist on the cell 2103 (C07, Lc09). At this point, C07 shown in an arrow 2104 is set as a color material amount of the dark color material and Lc09 shown in an arrow 2105 is set as a color material amount of the light color material. Subsequently, when the counter i goes to C08, the position relation between the cells constituting the equal density line around the equal color material amount line is reversed. Afterwards, the state where the position relation between the cell constituting the equal density and the cell constituting the equal color material amount does not change continues again until the counter i goes to C10. Then, the equal density line containing the target density will disappear on the map.

Figure 22:
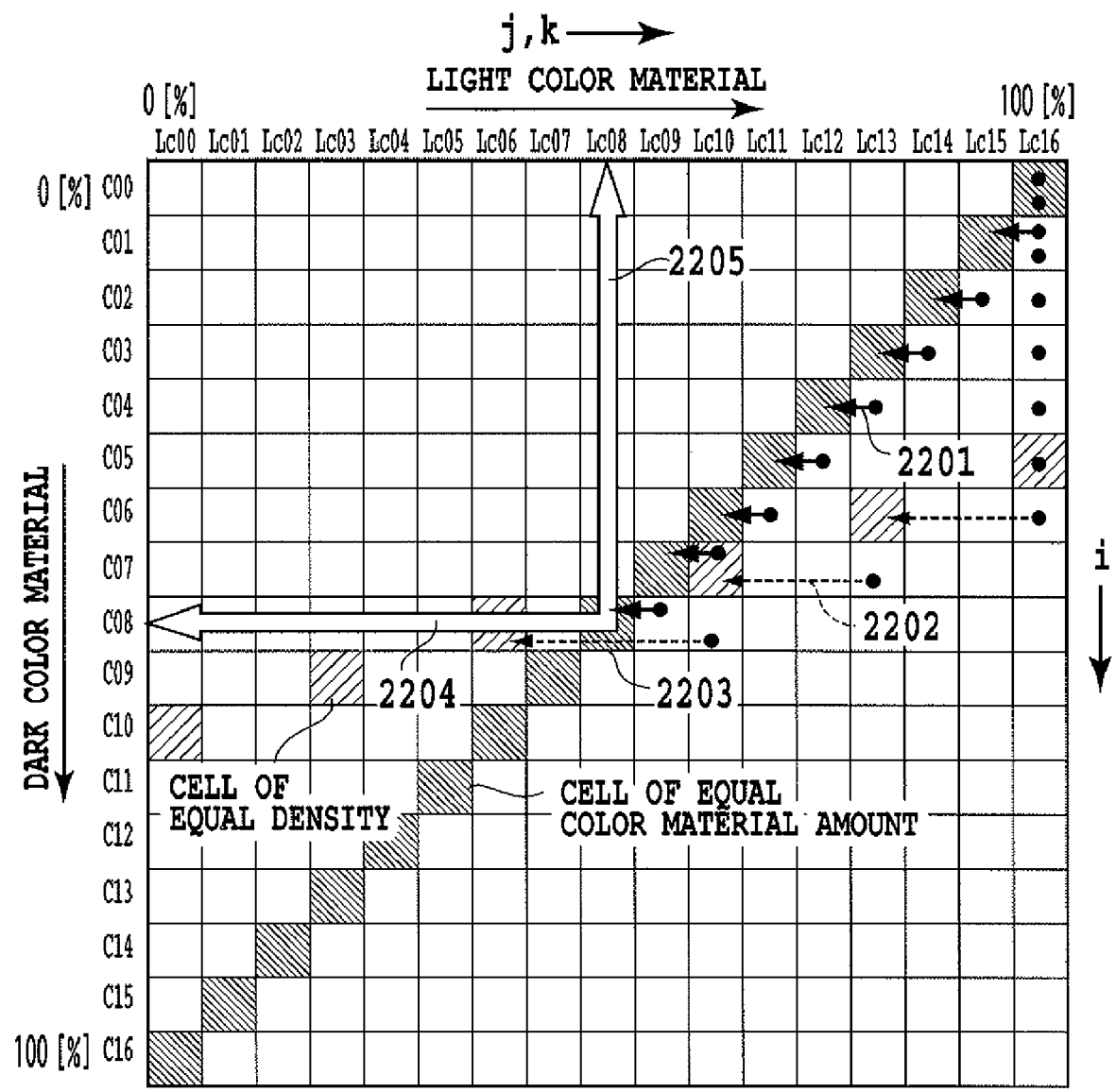
FIG. 22 is a diagram explaining a condition where a cell constituting an equal density and a cell constituting equal color material amount do not correspond in the second embodiment of the present invention.
Figure 23:
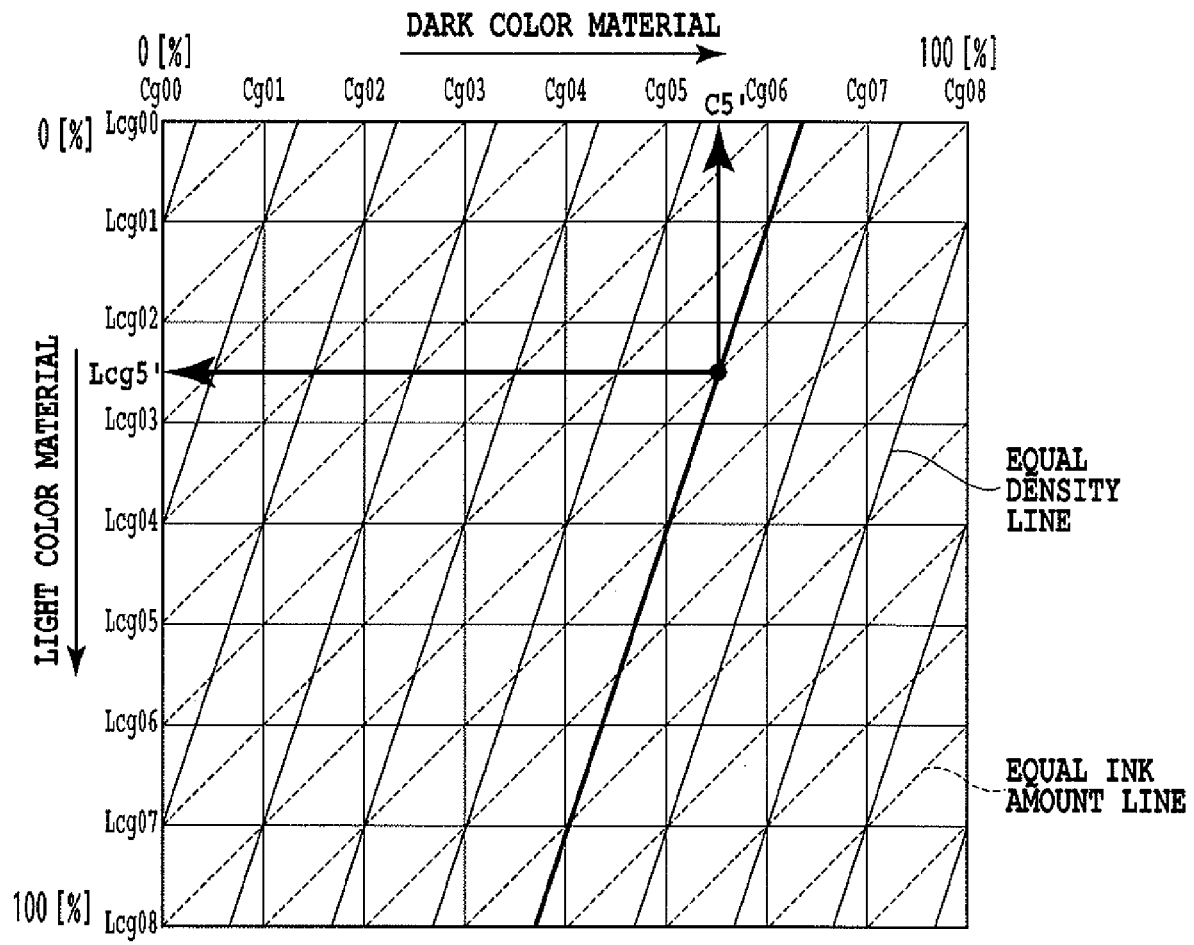
FIG. 23 is a diagram explaining a conventional method of determining an amount of color material.

FIG. 22 is a diagram explaining a state where a cell constituting an equal density does not correspond to a cell constituting an equal color material amount in aiming at high speeds. Similarly in FIG. 21, the search is performed from a maximum color material amount of the light color material to a direction where the color material amount decreases, setting as a search starting point a cell (C00, Lc16). An arrow 2201 (solid line) is search of a target color material use amount and the search of the target color material use amount is performed in the arrow direction. In addition, an arrow 2202 (broken line) is search of a target density and the search of the target density is performed in the arrow direction. During a little while after the search ha started, a cell of an equal color material amount containing the target density does not exist on a map (a state where a counter i exists in a range of from C00 to C04), and the search continues to be performed until a cell constituting an equal color material amount and a cell constituting an equal density exist on the same horizontal line. When the counter i reaches C05, a cell (C05, Lc11) constituting the equal color material amount and a cell (C05, Lc16) constituting the equal density exist on the search direction line for the first time and the intersection points are calculated. Afterwards, the state where the position relation between the cell constituting the equal density and the cell constituting the equal color material amount does not change continues on the same horizontal line until the counter i goes to C07. Therefore, continuously the search starts. In addition, when the counter i goes to C08, the position relation between the cells constituting the equal density around the equal color material amount line is reversed. Here, there is a case where the cell constituting the equal density does not correspond to the cell constituting the equal color material amount. In this case, for determining a combination of a color material amount in the dark color material and a color material amount of the light color material, the cell constituting the equal color material amount is required to be in close proximity to the cell constituting the equal density. Further in considering the load amount, a value of the cell constituting the equal density is smaller than that of the cell constituting the equal color material amount, that is, the cell constituting the equal density is required to be in the left side to the equal color material amount line as an axis. Therefore, the cell 2203 (C08, Lc08) is the optimal sell under the above condition. In a combination of each color material amount of the dark color material and the light color material, C08 shown in an arrow 2204 is set as a color material amount of the dark color material and Lc08 shown in an arrow 2205 is set as a color material amount of the light color material. Afterwards, the state where the position relation between the cell constituting the equal density line and the cell constituting the equal color material amount line does not change continues again until the counter i goes to C10. Thereafter, the equal density line containing the target density will disappear on the map.

As described above, according to the second embodiment, in a case of aiming at enhancing accuracy of table production for performing color separation of dark and light colors in searching the target density and the target color material use amount, the processing time required for the dark and light color separation processing can be reduced in proportion to the grid number in the cross patch.

Other Embodiment

With regard to the target density to be inputted in step S902, a cross patch is printed by a printer and a density value thereof measured by a measuring instrument is used. The present invention is, however, not limited to this and in place of the density value, a lightness value (L*) or a brightness value may be used. In this case, in the map as shown in FIG. 7, an equal lightness line and an equal brightness line are drawn, thereby determining the sell of each dark and light color separation from the intersection points.

In the color material amount characteristics map and the density characteristics map, an axis of the color material amount in the dark color material is used in the line direction and an axis of the color material amount in the light color material is used in the row direction, but each axis of the dark and light colors may be reversed.

Further, the color material amount characteristics map and the density characteristics map are constituted of cells of 17 lines×17 rows by the interpolation means, but a different type of cells may be used, as long as color material signal values can be expressed by equal intervals or any intervals by the cells of, for example, 33 lines×33 rows or 65 lines×65 rows. In addition, in a case of an 8 bit signal, 256 pieces of color material signal values constituted of 0 to 255 may be all used.

In addition, in the above-mentioned embodiments the arrangement examples are explained for executing color separation processing of the four-fundamental-color material system of cyan, magenta, yellow and black into the six-dark and light-color material system containing light cyan and light magenta color materials. However, the present embodiment is not limited to this, and can be applied to a device for executing color separation processing of the four-fundamental-color material system of cyan, magenta, yellow and black into an eight-dark and light-color material system containing light cyan, light magenta, light yellow and light black color materials.

It should be noted that the present invention may be applied to a system constituted of a plurality of devices (for example, host computer, interface device, reader and printer) and may be applied to a system constituted of a single device (for example, copier, fax machine).

An object of the present invention can be also achieved by providing a memory medium (recording medium) which has stored software for realizing the function of the above-mentioned embodiment to a system or a device to execute the software with a computer (CPU or MPU) in the system or the device. In this case, the software itself read out from the memory medium is to achieve the function in the above-mentioned embodiment and the memory medium storing the software constitutes the present invention.

The present invention includes not only an example where the function is realized by executing the software, but also includes an example where a part or an entirety of actual processing is executed with an operating system (OS) operating on the computer based upon an instruction of the software, thereby realizing the function.

In addition, the present invention also includes an example where the software is written in a memory of a function expanding card or a unit connected to a computer and a part or an entirety of actual processing is executed with a CPU of the card or the unit based upon an instruction of the software, thereby realizing the function.

In a case where the present invention is applied to the memory medium, the software corresponding to the flow chart explained before is stored in the memory medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-116790, filed Apr. 20, 2007, which is hereby incorporated by reference herein in its entirety.

What is claimed is:

1. A color separation method including processing for converting an image signal into a signal of a color material used in a printing apparatus, the processing converting the image signal into a color material signal containing a color material value of a dark color material and a color material value of a light color material, the method comprising:

a step of producing a density characteristics map including cells of M rows×N columns showing a density of each of the dark color material and the light color material;

a step of producing a color material amount characteristics map including cells of M rows×N columns showing a color material amount of each of the dark color material and the light color material;

a step of searching a cell of a target equal density from the density characteristics map and counting a row and a column of the searched cell of the target equal density in the density characteristics map;

a step of searching a cell of a target equal color material amount from the color material amount characteristics map and counting a row and a column of the searched cell of the target equal color material amount in the color material amount characteristics map;

a step of searching the cell in a certain direction in a certain row and determining whether the counted columns between the searched cell of the target equal density and the searched cell of the target equal color material amount correspond with each other;

a step of setting the color material amount of each of the dark color material and the light color material shown in the searched cell where the counted columns between the searched cell of the target equal density and the searched cell of the target equal color material amount correspond with each other, as a color material amount of each of the dark color material and the light color material, in a case where the counted columns between the searched cell of the target equal density and the searched cell of the target equal color material amount correspond with each other; and a step of setting the color material amount of each of the dark color material and the light color material shown in the searched cell on the color material amount characteristics map of the target equal color material amount as a color material amount of each of the dark color material and the light color material, in a case where the counted columns between the searched cell of the target equal density and the searched cell of the target equal color material amount do not correspond with each other, when a color material amount in the cell on the color material amount characteristics map exceeds the target equal color material amount.

2. A color separation method according to claim 1, wherein:

the dark color material comprises color materials of cyan, magenta, yellow and black colors; and the light color material comprises light cyan and light magenta.

3. A color separation method according to claim 1, wherein:

the dark color material comprises color materials of cyan, magenta, yellow and black colors; and the light color material comprises light cyan, light magenta, light yellow and light black.

4. An image processing apparatus including processing for converting an image signal into a signal of a color material used in a printing apparatus, the processing converting the image signal into a color material signal containing a color material value of a dark color material and a color material value of a light color material, the apparatus comprising:

means for producing a density characteristics map including cells of M rows×N columns showing a density of each of the dark color material and the light color material;

means for producing a color material amount characteristics map including cells of M rows×N columns showing a color material amount of each of the dark color material and the light color material;

means for searching a cell of a target equal density from the density characteristics map and counting a row and a column of the searched cell of the target equal density in the density characteristics map;

means for searching a cell of a target equal color material amount from the color material amount characteristics map and counting a row and a column of the searched cell of the target equal color material amount in the color material amount characteristics map;

means for searching the cell in a certain direction in a certain row and determining whether the counted columns between the searched cell of the target equal density and the searched cell of the target equal color material amount correspond with each other;

means for setting the color material amount of each of the dark color material and the light color material shown in the searched cell where the counted columns between the searched cell of the target equal density and the searched cell of the target equal color material amount correspond with each other, as a color material amount of each of the dark color material and the light color material, in a case where the counted columns between the searched cell of the target equal density and the searched cell of the target equal color material amount correspond with each other; and means for setting the color material amount of each of the dark color material and the light color material shown in the searched cell on the color material characteristics map of the target equal color material amount, as a color material amount of each of the dark color material and the light color material, in a case where the counted columns between the searched cell of the target equal density and the searched cell of the target equal color material amount do not correspond with each other, when a color material amount in the cell on the color material amount characteristics map exceeds the target equal color material amount.

5. An image processing apparatus according to claim 4, wherein:

the dark color material comprises color materials of cyan, magenta, yellow and black colors; and the light color material comprises light cyan and light magenta.

6. An image processing apparatus according to claim 4, wherein:

the dark color material comprises color materials of cyan, magenta, yellow and black colors; and the light color material comprises light cyan, light magenta, light yellow and light black.

7. A memory medium for storing a program readable in a computer, the program including processing for converting an image signal into a signal of a color material used in a printing apparatus, the processing executing color separation processing for converting the image signal into a color material signal containing a color material value of a dark color material and a color material value of a light color material in the computer, the processing comprising:

a step of producing a density characteristics map including cells of M rows×N columns showing a density of each of the dark color material and the light color material;

a step of producing a color material amount characteristics map including cells of M rows×N columns showing a color material amount of each of the dark color material and the light color material;

a step of searching a cell of a target equal density from the density characteristics map and counting a row and a column of the searched cell of the target equal density in the density characteristics map;

a step of searching a cell of a target equal color material amount from the color material amount characteristics map and counting a row and a column of the searched cell of the target equal color material amount in the color material amount characteristics map;

a step of searching the cell in a certain direction in a certain row and determining whether the counted columns between the searched cell of the target equal density and the searched cell of the target equal color material amount correspond with each other;

a step of setting the color material amount of each of the dark color material and the light color material shown in the searched cell where the counted columns between the searched cell of the target equal density and the searched cell of the target equal color material amount correspond with each other, as a color material amount of each of the dark color material and the light color material, in a case where the counted columns between the searched cell of the target equal density and the searched cell of the target equal color material amount correspond with each other; and a step of setting the color material amount of each of the dark color material and the light color material shown in the searched cell on the color material characteristics map of the target equal color material amount, as a color material amount of each of the dark color material and the light color material, in a case where the counted columns between the searched cell of the target equal density and the searched cell of the target equal color material amount do not correspond with each other, when a color material amount in the cell on the color material amount characteristics map exceeds the target equal color material amount.

* * * * *